(12) United States Patent
Giannakis et al.

(10) Patent No.: US 7,342,972 B1
(45) Date of Patent: Mar. 11, 2008

(54) TIMING SYNCHRONIZATION USING DIRTY TEMPLATES IN ULTRA WIDEBAND (UWB) COMMUNICATIONS

(75) Inventors: Georgios B. Giannakis, Minnetonka, MN (US); Liuqing Yang, Falcon Heights, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 767 days.

(21) Appl. No.: 10/796,567

(22) Filed: Mar. 8, 2004

Related U.S. Application Data

(60) Provisional application No. 60/453,659, filed on Mar. 8, 2003.

(51) Int. Cl.
H04L 27/00 (2006.01)

(52) U.S. Cl. .................. 375/259; 375/295; 375/316; 375/133

(58) Field of Classification Search ............ 375/259, 375/316, 295, 133
See application file for complete search history.

(56) References Cited

U.S. PATENT DOCUMENTS

| | | | |
|---|---|---|---|
| 6,556,621 | B1 | 4/2003 | Richards et al. |
| 6,744,832 | B2 * | 6/2004 | Miao ..................... 375/349 |
| 6,925,109 | B2 | 8/2005 | Richards et al. |
| 7,068,715 | B2 | 6/2006 | Hoctor et al. |
| 2001/0053175 | A1 * | 12/2001 | Hoctor et al. ............. 375/130 |
| 2003/0069025 | A1 * | 4/2003 | Hoctor et al. ............. 455/456 |
| 2003/0108133 | A1 | 6/2003 | Richards |
| 2003/0198212 | A1 * | 10/2003 | Hoctor et al. ............. 370/350 |
| 2003/0198308 | A1 * | 10/2003 | Hoctor et al. ............. 375/354 |
| 2004/0156421 | A1 | 8/2004 | Yamaguchi |

OTHER PUBLICATIONS

Z. Wang et al., "Block Precoding for MUI/ISI-Resilient Generalized Multicarrier CDMA with Multirate Capabilities," IEEE Transactions on Communications, vol. 49, No. 11, pp. 2016-2027, Nov. 2001.

F. Ramirez-Mireles et al., "System Performance Analysis of Impulse Radio Modulation," Proceedings Radio Wireless Conference, Colorado Springs, CO, pp. 67-70, Aug. 1998.

M. Win et al., "Ultra-Wide Bandwidth Time-Hopping Spread-Spectrum Impulse Radio for Wireless Multiple-Access Communications," IEEE Transactions on Communications, vol. 48, No. 4, pp. 679-691, Apr. 2000.

(Continued)

Primary Examiner—Mohammed Ghayour
Assistant Examiner—Juan Alberto Torres
(74) Attorney, Agent, or Firm—Shumaker & Sieffert, PA

(57) ABSTRACT

Techniques are described for synchronizing the timing of the receiver with the received waveform in ultra wideband (UWB) communication systems. The described techniques correlate the received waveform with dirty templates, i.e. segments of the received waveform, with the received waveform to estimate the timing offset. The described techniques include receiving an ultra wideband (UWB) waveform through a wireless communication channel, wherein the received UWB waveform comprises bursts of information-bearing symbols. A template is selected to be used for estimating the timing offset of a burst of the received UWB waveform, wherein the template comprises a segment of a burst of the received UWB waveform, and the template is correlated with a segment of a burst of the received waveform so as to form an estimate of the timing offset of the received UWB waveform. A stream of symbol estimates is output in accordance with the estimated timing offset.

44 Claims, 17 Drawing Sheets

OTHER PUBLICATIONS

A. Saleh et al., "A Statistical Model for Indoor Multipath Propagation," IEEE Journal on Selected Areas in Communications, vol. SAC-5, No. 2, pp. 128-137, Feb. 1987.

B. Hassibi et al., "On the Expected Complexity of Sphere Decoding," Proceedings of the Asilomar Conference on Signals, Systems and Computers, vol. 2, pp. 1051-1055, 2001.

B. Hochwald et al., "Unitary Space-Time Modulation for Multiple-Antenna Communications in Rayleigh Flat Fading," IEEE Transactions on Information Theory, vol. 46, No. 2, pp. 543-564, Mar. 2000.

C. Le Martret et al., "All-Digital PPM Impulse Radio for Multiple-Access Through Frequency-Selective Multipath," Procedures of GLOBECOM, vol. 1, pp. 22-26, San Francisco, CA, Nov. 17-Dec. 1, 2000.

C.J. Le Martret et al., "All-Digital Impulse Radio with Multiuser Detection for Wireless Cellular Systems," IEEE Transactions on Communications, vol. 50, No. 9, pp. 1440-1450, Sep. 2002.

C.J. Le Martret et al., "All-Digital PAM Impulse Radio for Multiple-Access Through Frequency-Selective Multipath," Procedure of Sensor Array and Multichannel Signal Processing Workshop, Boston, pp. 77-81, Mar. 2000.

D. Cassioli et al., "Performance of Low-Complexity Rake Reception in a Realistic UWB Channel," 2002 IEEE International Conference on Communications, pp. 763-767, New York City, N.Y., Apr. 28-May 2, 2002.

E. Homier et al., "Rapid Acquisition of Ultra-Wideband Signals in the Dense Multipath Channel," G.E Research Development Center, Technical Information Series, pp. 105-109, Jan. 2002.

F. Gini et al., "Frequency Offset and Symbol Timing Recovery in Flat-Fading Channels: A Cyclostationary Approach," IEEE Transactions On Communications, vol. 46, No. 3, pp. 400-411, Mar. 1998.

F. Ramirez-Mireles et al., "Multiple Access With Time-Hopping and Block Waveform PPM Modulation," 1998 IEEE International Conference on Communications, vol. 2 of 3, pp. 775-779, Atlanta, Georgia, Jun. 1998.

G. Leus et al., "MUI-Free Receiver for a Synchronous DS-CDMA System Based on Block Spreading in the Presence of Frequency-Selective Fading," IEEE Transactions on Signal Processing, vol. 48, No. 11, pp. 3175-3188, Nov. 2000.

G.B. Giannakis et al., "AMOUR-Generalized Multicarrier Transceivers for Blind CDMA Regardless of Multipath," IEEE Transactions on Communications, vol. 48, No. 12, pp. 2064-2076, Dec. 2000.

H. Lee et al., "Multipath Characteristics of Impulse Radio Channels," 2000 IEEE 51st Vehicular Technology Conference Proceedings, Tokyo, Japan, pp. 2487-2491, May 15-18, 2000.

J.D. Choi et al., "Performance of Autocorrelation Receivers for Ultra-Wideband Communications with PPM in Multipath Channels," 2002 IEEE Conference on Ultra Wideband Systems and Technologies, pp. 213-217, Baltimore, MD, USA, May 2002.

J.D. Choi et al., "Perfomance of Ultra-Wideband Communications With Suboptimal Receivers in Multipath Channels," IEEE Journal on Selected Areas in Communications, vol. 20, No. 9, pp. 1754-1766, Dec. 2002.

J.K. Cavers, "An Analysis of Pilot Symbol Assisted Modulation for Rayleigh Fading Channels," IEEE Transactions On Vehicular Technology, vol. 40, No. 4, pp. 686-693, Nov. 1991.

J.R. Foerster, "The Effects of Multipath Interference on the Performance of UWB Systems in and Indoor Wireless Channel," IEEE VTS 53rd Vehicular Technology Conference, vol. 2, pp. 1176-1180, Rhodes, Greece, May 6-9, 2001.

J.R. Foerster et al., "Ultra-Wideband Technology for Short- or Medium-Range Wireless Communications," Ultra-Wideband Technology for Short- or Medium-Range Wireless Communications, pp. 1-11, Apr. 2001.

K.Siwiak et al., "Ultra-Wide Band Radio: The Emergence of An Important New Technology," IEEE VTS 53rd Vehicular Technology Conference, vol. 2, pp. 1169-1172, Rhodes, Greece, May 6-9, 2001.

L. Yang et al., "Multistage Block-Spreading for Impulse Radio Multiple Access Through ISI Channels," IEEE Journal on Selected Areas in Communications, vol. 20, No. 9, pp. 1767-1777, Dec. 2002.

L. Yang et al., "Space-Time Coding for Impulse Radio," 2002 IEEE Conference on Ultra Wideband Systems and Technologies, pp. 235-239, Baltimore, MN, May 20-23, 2002.

L. Yang et al., "Impulse Radio Muliple Access Through ISI Channels With Multi-Stage Block-Spreading" 2002 IEEE Conference on Ultra Wideband Systems and Technologies, pp. 277-281, Baltimore, MD, May 21-23, 2002.

L. Yang et al., "Optimal Pilot Waveform Assisted Modulation for Ultrawideband Communications," IEEE Transactions on Wireless Communications, vol. 3, No. 4, pp. 1236-1349, Jul. 2004.

L. Yang et al., "Non-Data Aided Timing Acquisition of Ultra-Wideband Transmissions Using Cyclostationarity," 2003 IEEE International Conference on Acoustics, Speech and Signal Processing, Hong Kong, vol. IV of VI, Apr. 6-10, 2003.

M.Z. Win et al., "Impulse Radio: How it Works," IEEE Communications Letters, vol. 2, No. 2, pp. 36-38, Feb. 1998.

M.L. Welborn, "System Considerations for Ultra-Wideband Wireless Networks," 2001 IEEE Radio and Wireless Conference, pp. 5-8, Boston, MA, Aug. 19-22, 2001.

M.Z. Win et al., "On the Energy Capture of Ultrawide Bandwidth Signals in Dense Multipath Environments," IEEE Communications Letters, vol. 2, No. 9, pp. 245-247, Sep. 1998.

M.Z. Win et al., "Virtual Path Analysis of Selective Rake Receiver in Dense Multipath Channels," IEEE Communications Letters, vol. 3, No. 11, pp. 308-310, Nov. 1999.

M.Z. Win et al., "ATM-Based TH-SSMA Network for Multimedia PCS," IEEE Journal on Selected Areas in Communications, vol. 17, No. 5, pp. 824-836, May 1999.

O. Wintzell et al., "On the Capacity of a Pulse-Position-Hopped CDMA System," IEEE Transactions On Information Theory, vol. 47, No. 6, pp. 2639-2644, Sep. 2001.

P. Withington, II et al., "An Impulse Radio Communications System," Ultra-Wideband, Short-Pulse Electromagnetics, Brooklyn, NY, pp. 113-12, Oct. 1992.

R. Fleming et al., "Rapid Acquisition for Ultra-Wideband Localizers," 2002 IEEE Conference on Ultra Wideband Systems and Technologies, Balimore, MD, pp. 245-249, May 21-21, 2002.

R.A. Scholtz, "Multiple Access with Time-Hopping Impulse Modulation," Communications On The Move, Boston, MA, USA, pp. 447-450, Oct. 1993.

R.T. Hoctor et al., "An Overview of Delay-Hopped, Transmitted-Reference RF Communications," GE Research and Development Center, Technical Information Series, pp. 1-29, Jan. 2002.

S. Adireddy et al., "Optimal Placement of Training for Frequency-Selective Block-Fading Channels," IEEE Transactions On Information Theory, vol. 48, No. 8, pp. 2338-2353, Aug. 2002.

S. Ohno et al., "Optimal Training and Redundant Precoding for Block Transmissions with Application to Wireless OFDM," IEEE Transactions on Communications, vol. 50, No. 12, Dec. 2002.

S. Zhou et al., "Space-Time Coding with Maximum Diversity Gains Over Frequency-Selective Fading Channels," IEEE Signal Processing Letters, vol. 8, No. 10, pp. 269-272, Oct. 2001.

S. Zhou et al., "Chip-Interleaved Block-Spread Code Division Multiple Access," IEEE Transactions on Communications, vol. 50, No. 2, pp. 235-248, Feb. 2002.

S.M. Alamouti, "A Simple Transmit Diversity Technique for Wireless Communications," IEEE Journal On Selected Areas In Communications, vol. 16, No. 8, pp. 1451-1458, Oct. 1998.

S.S. Kolenchery et al., "A Novel Impulse Radio Network for Tactical Wireless Communications," Procedures Milcom Conference, Bedford, MA, Oct. 1998.

S.S. Kolenchery et al., "Performance of Local Power Control in Peer-to-Peer Impulse Radio Networks With Bursty Traffic," IEEE Global Telecommunications Conference, vol. 2 of 3, Phoenix, AZ, USA, pp. 910-916, Nov. 3-8, 1997.

U. Fincke et al., "Improved Methods For Calculating Vectors of Short Length in a Lattice, Including a Complexity Analysis," Mathematics of Computation, vol. 44, No. 170, pp. 463-471, Apr. 1985.

V. Lottici et al., "Channel Estimation for Ultra-Wideband Communications," IEEE Journal on Selected Areas in Communications, vol. 20, No. 9, pp. 1638-1645, Dec. 2002.

V. Tarokh et al., "Space-Time Block Codes From Orthogonal Designs," IEEE Transactions on Information Theory, vol. 45, No. 5, pp. 1456-1467, Jul. 1999.

V. Tarokh et al., "Space-Time Codes for High Data Rate Wireless Communication: Performance Criterion and Code Construction," IEEE Transactions on Information Theory, vol. 44, No. 2, pp. 744-765, Mar. 1998.

W.M. Lovelace et al., "The Effects of Timing Jitter on the Performance of Impulse Radio," 2002 IEEE Conference on Ultra Wideband Systems and Technologies, pp. 251-254, Baltimore, MD, May 21-23, 2002.

X. Chen et al., "Monocycle Shapes for Ultra Wideband System," 2002 IEEE International Symposium on Circuits and Systems, vol. I of V, pp. I-597-I-600, Scottsdale, AZ, May 25-29, 2002.

Z. Tian et al., "Symbol Timing Estimation in Ultra-Wideband Communications," Procedures of 36th Asilomar Conference on Signals, Systems, and Computers, Pacific Grove, CA, Nov. 3-6, 2002.

Z. Wang et al., "Wireless Multicarrier Communications: Where Fourier Meets Shannon," IEEE Signal Processing Magazine, vol. 47, No. 3, pp. 1-21, May 2000.

Z. Wang et al., "Vandermonde-Lagrange Mutually Orthogonal Flexible Transceivers for Blind CDMA in Unkown Multipath," Procedures of Workshop on Signal Processing Advances in Wireless Communication, Annapolis, MD, pp. 42-45, May 9-12, 1999.

B. Parr et al., "A Novel Ultra-Wideband Pulse Design Algorithm," IEEE Communications Letter, vol. 7, No. 5 , pp. 219-221, May 2003.

J. Romme et al., "On the Power Spectral Density of Time-Hopping Impulse Radio," 2002 IEEE Conference on Ultra-Wideband Systems and Technologies, Wyndham Baltimore Inner Harbor, pp. 241-244, May 2002.

M.Z. Win, "Spectral Density of Random UWB Signals," IEEE Communications Letters, vol. 6, No. 12, pp. 526-528, Dec. 2002.

J. Han et al., "A New Ultra-Wideband, Ultra-Short Monocycle Pulse Generator with Reduced Ringing," IEEE Microwave and Wireless Components Letters, vol. 12, No. 6, pp. 206-208, Jun. 2002.

J.S. Lee et al., "New Uniplanar Subnanosecond Monocycle Pulse Generator and Transformer for Time-Domain Microwave Applications," IEEE Transactions on Microwave Theory and Techniques, vol. 49, No. 6, pp. 1126-1129, Jun. 2001.

T.W. Parks et al., "Chebyshev Approximation for Nonrecursive Digital Filters with Linear Phase," IEEE Transactions on Circuit Theory, vol. CT-19, No. 2, pp. 189-194, Mar. 1972.

D. Kelly et al., "PulsON Second Generation Timing Chip: Enabling UWB Through Precise Timing," 2002 IEEE Conference on Ultra-Wideband Systems and Technologies, Wyndham Baltimore Inner Harbor, pp. 117-121, May 2002.

Z. Wang et al., "Complex-Field Coding for OFDM Over Fading Wireless Channels," IEEE Transactions on Information Theory, vol. 49, No. 3, pp. 707-720, Mar. 2003.

A.V. Oppenheim, et al., *Discrete-Time Signal Processing*, 2nd Edition, Prentice Hall, Chapter 7, "Optimum Approximations of Fir Filters," pp. 486-511, 1999.

FCC Report and Order, *In the Matter of Revision of Part 15 of the Commisssion's Rules Regarding Ultra-Wideband Transmission Systems*, FCC 02-48, pp. 7434-7553, Apr. 2002.

IEEE P802.15 Working Group for WPAN, *Channel Modeling Sub-Committee Report Final*, IEEE 802.15-02/368r5-SG3a, pp. 1-40, Nov. 2002.

L. Yang et al., "Digital-Carrier Multi-Band User Codes for Baseband UWB Multiple Access," Journal of Communications and Networks, vol. 5, No. 4, pp. 374-385, Dec. 2003.

M. Hamalainen et al., On the UWB System Coexistence With GSM900, UMTS/WCDMA, and GPS, IEEE Journal on Selected Areas in Communications, vol. 20, No. 9, pp. 1712-1721, Dec. 2002.

L. Zhao et al., "Performance of Ultra-Wideband Communications in the Presence of Interference," IEEE Journal on Selected Areas in Communications, vol. 20, No. 9, pp. 1684-1691, Dec. 2002.

S. Zhou et al., "Digital Multi-Carrier Spread Spectrum Versus Direct Sequence Spread Spectrum for Resistance to Jamming and Multipath," IEEE Transactions on Communications, vol. 50, No. 4, pp. 643-655, Apr. 2002.

Kumar et al., "Application of Layered Space-Time Processing to Ultrawideband Communication," the 2002 45th Midwest Symposium on Circuits and Systems, 2002, MWSCAS-2002, vol. 3, Aug. 4-7, 2002, pp. III-597-600, vol. 3.

P. Withington, "Impulse Radio Overview," Time Domain Corp., pp. 1-7, published in Jan. 1998.

X. Luo et al., "Designing Optimal Pulse-Shapers for Ultra-Wideband Radios," Journal of Communications and Networks, vol. 5, No. 4, pp. 344-353, Dec. 2003.

J.R. Foerster, "The Performance of a Direct-Sequence Spread Ultra-Wideband System in the Presence of Multipath, Narrowband Interference, and Multiuser Interference," 2002 IEEE Conference on Ultra Wideband Systems and Technologies, Wyndham Baltimore Inner Harbor, pp. 87-92, May 2002.

B.M. Sadler et al., "On the Performance of UWB and DS-Spread Spectrum Communication Systems," 2002 IEEE Conference on Ultra Wideband Systems and Technologies, Wyndham Baltimore Inner Harbor, pp. 289-292, May 2002.

R.A. Scholtz, "Multiple Access with Time-Hopping Impulse Modulation," Communications on the Move, Conference Record vol. 2 of 3, MILCOM Conference, Boston, MA, pp. 447-450, Oct. 11-14, 1993.

Z. Wang, "Multi-Carrier Ultra-Wideband Multiple-Access with Good Resilience Against Multiuser Interference," 2003 Conference on Information Science & Systems, The John Hopkins University, Baltimore, MD, pp. 1-5, Mar. 2003.

S. Cassioli, et al., "Performance of Low-Complexity Rake Reception in a Realistic UWB Channel," 2002 IEEE International Conference on Communications, New York, NY, pp. 763-767, Apr. 28-May 2, 2002.

Z. Wang et al., "A Simple and General Parameterization Quantifying Performance in Fading Channels," IEEE Transactions on Communications, vol. 51, No. 8, pp. 1389-1398, Aug. 2003.

L. Yang et al., "Analog Space-Time Coding for Multiantenna Ultra-Wideband Transmissions," IEEE Transactions on Communications, vol. 52, No. 3, pp. 507-517, Mar. 2004.

I. Bergel et al., "Narrow-Band Interference Suppression in Time-Hopping Impulse-Radio Systems," 2002 IEEE Conference on Ultra Wideband Systems and Technologies, Wyndham Baltimore Inner Harbor, pp. 303-307, May 2002.

L. Yang et al., "Unification of Ultra-Wideband Multiple Access Schemes and Comparison in the Presence of Interference," The Thirty-Seventh Asilomar Conference on Signals, Systems & Computers, Pacific Grove, CA, pp. 1239-1243, Nov. 2003.

G. Durisi, et al., "Performance of TH and DS UWB Multiaccess Systems in Presence of Multipath Channel and Narrowband Interference," Procedure of International Workshop on Ultra Wideband Systems, Oulu, Finland, 5 pages, Jun. 2003.

\* cited by examiner

TIMING SYNCHRONIZATION USING DIRTY TEMPLATES IN ULTRA WIDEBAND (UWB) COMMUNICATIONS

This application claims priority from U.S. Provisional Application Ser. No. 60/453,659, filed Mar. 8, 2003, the entire content of which is incorporated herein by reference.

STATEMENT REGARDING FEDERALLY SPONSORED RESEARCH OR DEVELOPMENT

This invention was made with Government support under Subcontract #497420 awarded by the University of Delaware (Army Prime #DAAD19-01-2-011). The Government may have certain rights in the invention.

TECHNICAL FIELD

The invention relates to communication systems and, more particularly, transmitter and receivers used in wireless communication systems.

BACKGROUND

In general, a receiver in a wireless communication system does not have a priori knowledge of the physical channel over which the transmitted signal propagates or the time at which a transmitter transmits the signal. Timing synchronization, also known as clock recovery, is the process by which the receiver processes a received signal to determine the precise transition points within the received waveform. In other words, the receiver attempts to "synchronize" or align its clock with the clock of the arriving waveform. This process requires the receiver to estimate or otherwise determine the appropriate "timing offset" of the received signal, i.e., the amount of skew between the transmitter's clock and that of the arriving waveform.

Incorrect determination of the timing offset can have detrimental effects on other receiver operations, such as channel estimation, symbol detection, and the like. For example, an incorrect timing offset may cause the received waveform to be sampled at times during which the waveform is in transition between two symbols resulting in an increased number of symbol detection errors.

In general, timing synchronization in wireless communication systems typically comprises "peak-picking" the output of a sliding correlator between the received signal and a transmit-waveform template. The receiver uses the output of the sliding correlator to estimate the timing offset.

Ultra-wideband (UWB) systems transmit information via baseband transmissions with high penetration capability and rich multipath diversity that can be collected with low-complexity RAKE reception. However, the information-bearing waveforms are impulse-like and have low power, which increases the difficulty in achieving accurate and efficient timing synchronization. Additionally, peak-picking the output of a sliding correlator between the received waveform and the transmit-waveform template is suboptimum in the presence of dense multipath, and results in high receiver complexity with slow acquisition times.

Existing sliding correlator timing synchronization techniques operate with assumptions that are unrealistic in UWB systems. More specifically, many techniques require unrealistic assumptions such as an absence of noise or other interference, absence of multipath, and a priori knowledge of the communication channel. For example, one technique, referred to as coarse bin reversal searching, operates under the assumption that there is no noise. Coarse bin reversal searching estimates the arrival time of the received waveform by dividing each symbol duration into thousands of bins and searching for the bin containing the greatest energy with a sliding correlator. Another technique uses a coded beacon sequence designed in conjunction with a bank of correlators to operate in the absence of multipath. The coded beacon sequence is cross-correlated with the received waveform and estimates the location of the beacon sequence within the received waveform via peak-picking. The location of the beacon sequence is used to estimate the timing offset. Non-data-aided, i.e. blind, timing synchronization techniques operate in the presence of dense multipath but require that there is no time-hopping (TH) within each symbol. Such blind timing synchronization techniques use cross-correlation and rely on dense multipath and the cyclostationarity that arises from the time-hopping restriction. So called "ranging systems" do not use a sliding correlator, but rather use a priori knowledge of the strongest path of the communication channel to estimate the distance between transmitter and receiver.

Consequently, such conventional timing synchronization techniques do not operate functionally in realistic UWB environments. Moreover, many of these conventional timing synchronization techniques for UWB systems, especially those that utilize a sliding correlator with a transmit-waveform template, result in slow acquisition and high receiver complexity.

SUMMARY

In general, techniques are described that provide timing synchronization via correlating received waveforms with "dirty" templates, in wireless communication systems, such as ultra-wideband systems (UWB). Unlike exiting UWB timing synchronization techniques and early-late gate narrowband timing synchronization techniques, the techniques described herein peak-pick the output of a sliding correlator with "dirty templates," i.e. templates that propagate through the UWB communication channel. These dirty templates are segments of the received waveform and are not only distorted by the unknown channel but also noisy and subject to the unknown timing offset. As shown herein, the use of the dirty templates in timing synchronization may achieve increased energy capture, resulting in improved performance and enabling reduced receiver complexity. Further, the described techniques are able to achieve timing synchronization at any desirable resolution, and are applicable to non-UWB systems provided inter-symbol interference is absent or minimal.

In one embodiment, the invention is directed to a method which processes a data stream of information-bearing symbols to form bursts of information symbols and arranges training symbols within the stream of information-bearing symbols to ensure one polarity transition within three training symbols at a receiver to synchronize timing of a transmitter and the receiver. The method outputs the bursts of information-bearing symbols and training symbols as an ultra wideband (UWB) waveform through a communication channel to the receiver.

In another embodiment, the invention is directed to a method which receives an ultra wideband (UWB) waveform through a wireless communication channel, wherein the received UWB waveform comprises bursts of information-bearing symbols. A template is selected to be used for estimating the timing offset of a burst of the received UWB waveform, wherein the template comprises a segment of a burst of the received UWB waveform and the template is correlated with a segment of a burst of the received waveform so as to form an estimate of the timing offset of the received UWB waveform. A stream of symbol estimates is output in accordance with the estimated timing offset.

In yet another embodiment, the invention is directed to a wireless communication device comprising a pulse generator and a pulse shaping unit. The pulse generator processes a data stream of information bearing symbols to form bursts of information bearing symbols and arranges training symbols within the stream of information-bearing symbols to ensure one polarity transition within three training symbols at a receiver to synchronize timing of a transmitter and the receiver. The pulse shaping unit outputs an ultra wideband (UWB) transmission waveform from the bursts of information-bearing symbols and training symbols.

In an additional embodiment, the invention is directed to a wireless communication device comprising an antenna to receive an ultra wideband (UWB) waveform through a wireless communication channel, wherein the received UWB waveform includes bursts of information-bearing symbols, a timing synchronization unit to form an estimation of a timing offset based on the received UWB waveform, and a symbol detector to output a stream of estimate symbols based on the estimate of the timing offset.

In another embodiment, the invention is directed to a system comprising a transmitter and a receiver. The transmitter processes a data stream of symbols to form bursts of information-bearing symbols and generates an ultra wideband (UWB) waveform through a wireless communication channel. The receiver receives the transmitted signal through a wireless communication channel, selects a segment of the received UWB waveform to use as a template, forms an estimate of the timing offset based on the correlation of the template with the received UWB waveform, and outputs a stream of estimate symbols based on the estimate of the timing.

The timing synchronization techniques described herein may offer one or more advantages. For example, peak-picking the output of a sliding correlator with dirty templates allows timing synchronization in realistic UWB environments, and some non-UWB systems as well, provided intersymbol interference is avoided. In particular, the described techniques operate in the presence of noise, multipath, time-hopping, and multiple users. Additionally, timing synchronization can be achieved at any desirable resolution by selecting the time increment at which each correlation is performed within a symbol duration. Moreover, voltage controlled clock (VCC) circuits can be used to implement the receiver, which may yield lower-complexity UWB receivers than with conventional techniques.

Other advantages that may be provided by the described techniques include a selectable trade-off between performance and bandwidth efficiency. Selecting data-aided dirty templates may increase the performance of the described techniques. For example, a dirty template with four training symbols increases the performance by reducing the number of operations required at the receiver to synchronize timing with the transmitter. However, selecting a non-data-aided, template provides a more efficient use of bandwidth.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
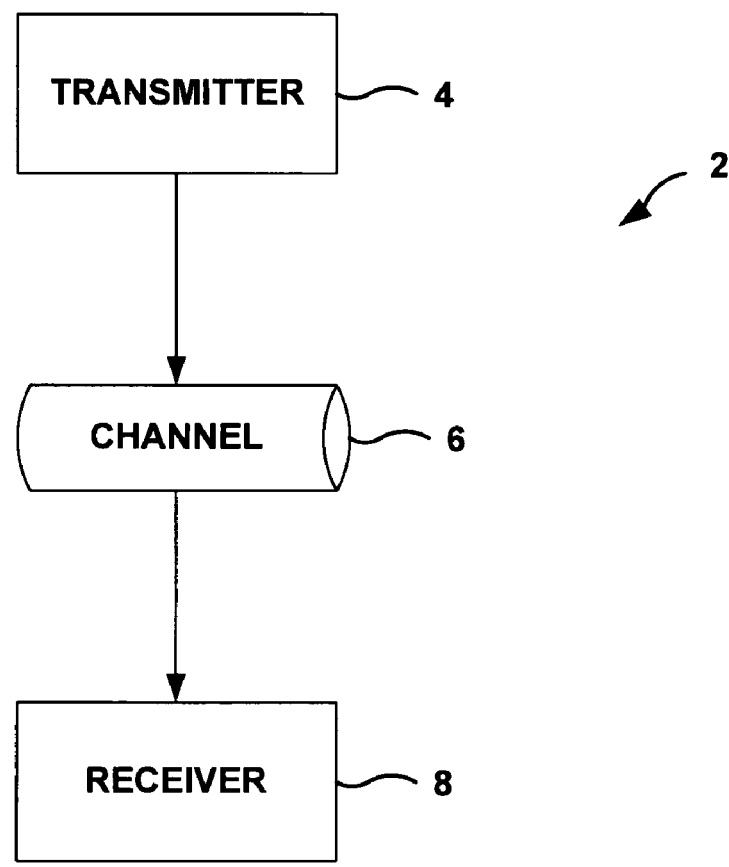
FIG. 1 is a block diagram illustrating a wireless communication system using an ultra-wideband (UWB) format performing timing synchronization with dirty templates.

FIG. 1 is a block diagram illustrating ultra wideband (UWB) communication system 2 in which transmitter 4 communicates with receiver 8 through wireless channel 6. The techniques are described in reference to UWB, but are also applicable to any non-UWB system provided intersymbol interference is avoided or minimized. In general, the invention provides techniques for performing timing synchronization with "dirty templates", i.e., segments of the received waveform which propagates through channel 6. In the described embodiments, communication system 2 may be subject to noise, multipath, multiple-users, and time-hopping (TH). The dirty template can be selected to be "data-aided," i.e., selected to include one or more training symbols, or "non-data-aided," also referred to as "blind." As shown herein, data-aided dirty templates generally result in higher performance, while blind dirty templates result in a more efficient use of bandwidth.

Transmitter 4 transmits data as a UWB waveform using a modulation scheme, such as pulse position modulation (PPM) or pulse amplitude modulation (PAM). For simplicity, the examples that follow will be described using antipodal PAM. User separation is achieved via TH codes which time-shift the pulse positions at multiples of the chip duration $T_c$. Each information-bearing symbol is transmitted over $N_f$ frames each of duration $T_f$. During each frame, a data modulated ultra short pulse p(t) that has duration $T_p \ll T_f$ is transmitted. Each pulse, also referred to as a monocycle, can have a Gaussian, Rayleigh, or other shape used in wireless communications. At time t=t1 transmitter 4 transmits the UWB waveform according to equation (1). The energy per monocycle is denoted $\epsilon$, s(k) is the $k^{th}$ symbol, and $p_T(t)$ denotes the transmitted symbol waveform according to equation (2) with $N_f$ monocycles shifted by the TH code $c_{n_f}$ during the $n_f^{th}$ frame.

$$u(t) = \sqrt{E} \sum_{k=0}^{+\infty} s(k) p_T(t - kT_s - t_1) \quad (1)$$

$$p_T(t) := \sum_{n_f=0}^{N_f-1} p(t - n_f T_f - c_{n_f} T_c) \quad (2)$$

Receiver 8 receives the transmitted UWB waveform through communication channel 6 which is modeled as a tapped-delay line with L+1 taps with coefficients $\{\alpha_l\}_{l=0}^L$ and delays $\{\tau_l\}_{l=0}^L$ satisfying $\tau_l < \tau_{l+1}$, $\forall l$. As a result, the waveform arriving at the receiver is given by equation (3). Additionally, channel 6 is modeled as quasi-static, i.e., the channel coefficients and delays remain invariant over one transmission burst, but can change independently from burst to burst.

$$r(t) = \sum_{l=0}^L \alpha_l u(t - \tau_l) \quad (3)$$

Denoting the first arrival time at receiver 8 with $t_2$, and the propagation delay through channel 6 as $\tau_0$, the first arrival time can be written $t_2 = t_1 + \tau_0$. Relative to $\tau_0$, other path delays can be uniquely described by $\tau_l$, $0 = \tau_l - \tau_0$. Consequently, the aggregate channel, i.e. channel 6 in combination with the pulse shaper of transmitter 4, is given by equation (4). Equation (5) expresses the received waveform where the received symbol waveform is defined according to equation (6). The noise term w(t) includes additive white Gaussian noise (AWGN) and multiple user interference (MUI). Inter-symbol interference is avoided by selecting $T_f \geq \tau_{L,0} + T_p$ and $c_0 = c_{N_f-1} = 0$ which confines $p_r(t)$ over an interval of duration $[0, T_s)$.

$$h(t) := \sum_{l=0}^L \alpha_l p(t - \tau_{l,0}) \quad (4)$$

$$r(t) = \sqrt{E} \sum_{k=0}^{+\infty} s(k) p_R(t - kT_s - t_2) + w(t) \quad (5)$$

$$p_R(t) = \sum_{l=0}^L \alpha_l p_T(t - \tau_{l,0}) \quad (6)$$

The received waveform r(t) is received by receiver 8 at time $t_2$, but receiver 8 does not know transmission time $t_1$ or propagation delay $\tau_0$. Therefore, receiver 8 initiates recovery techniques, such as timing synchronization, channel estimation and symbol detection, at time $t_3$ when a change in the energy of received waveforms is detected. Receiver 8 initiates recovery techniques at time $t_3$ after the arrival of the first received waveform at time $t_2$ where $t_3 > t_2$. The timing offset may be viewed as the difference in time between $t_3$ and the starting time of a symbol at or after $t_3$. The first symbol starting after $t_3$ is received at time t defined in equation (7). The arrival time $t_2$ serves as reference while time $t_1$ plays no role. As a result, $t_2$ is set to zero without loss of generality.

$$t = t_2 + \lceil (t_3 - t_2)/T_s \rceil T_s \quad (7)$$

Equations (8, 9) allow timing synchronization to be corrected by an integer number $n_\epsilon \in [0, N_f-1]$ of frames such that $t_3 + n_\epsilon T_f$ is close to either $NT_s$ or $(N+1)T_s$ within one symbol duration.

$$N := t_3/T_s \quad (8)$$

$$\epsilon := t_3 - NT_s \quad (9)$$

Data-aided dirty templates based on a finite number of training symbols must satisfy equation (10) where K is the total number of training symbols, i.e. preamble, and $K_0$ is the minimum number of training symbols required to implement the described data-aided timing synchronization with dirty templates.

$$N \leq K - K_0 \quad (10)$$

The techniques described herein may be applied to uplink and/or downlink UWB transmissions, i.e., transmissions from a base station to a mobile device and vice versa. Consequently, transmitter 4 and receiver 8 may be any device configured to communicate using a wireless transmission including a distribution station, a hub for a wireless local area network, a mobile phone, a laptop or handheld computing device, a personal digital assistant (PDA), a device within a wireless personal area network, a device within a sensor network, or other device.

Figure 2:
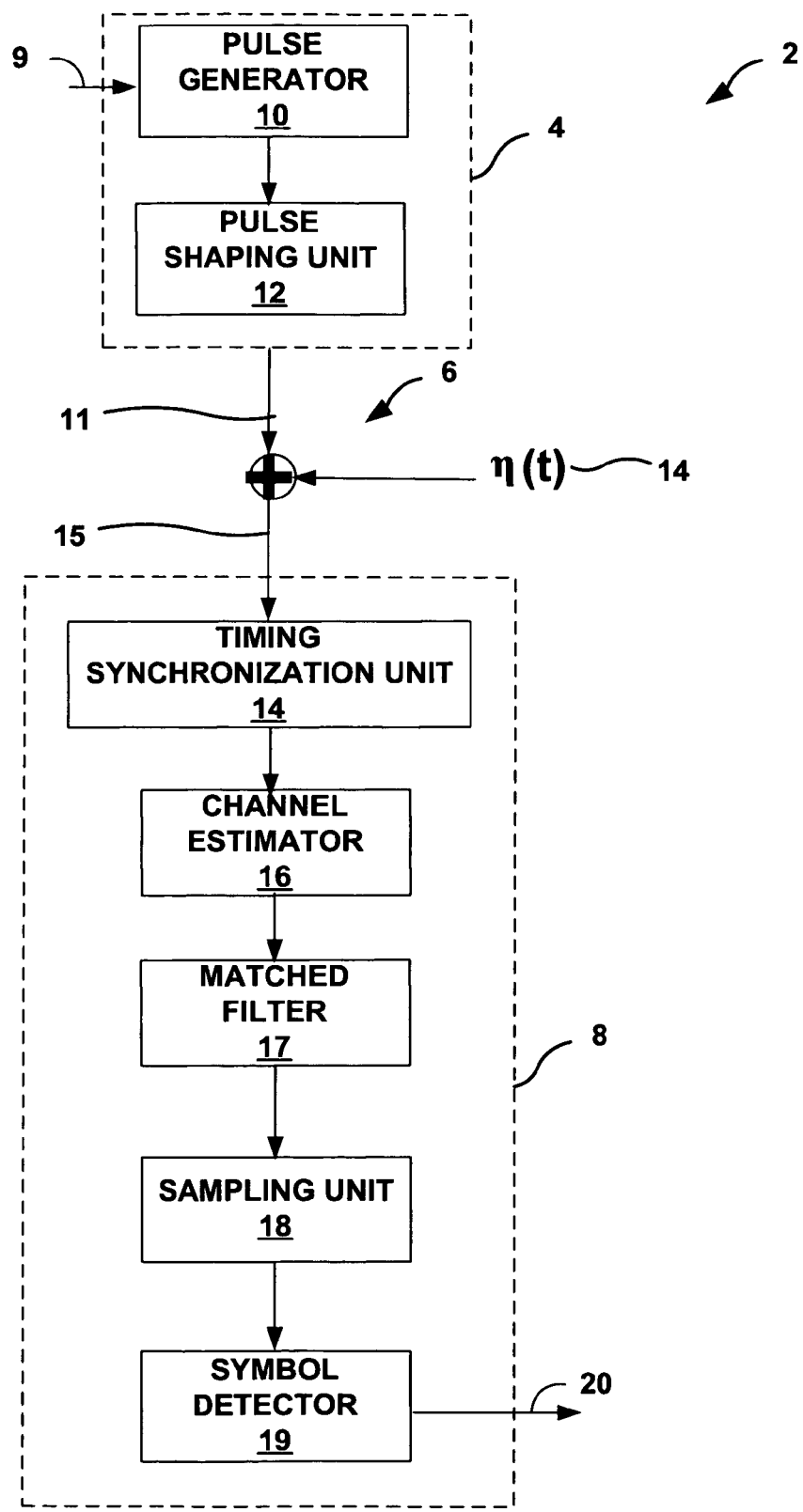
FIG. 2 is a block diagram illustrating in further detail the wireless communication system of FIG. 1.

FIG. 2 is a block diagram illustrating in further detail transmitter 4 and receiver 8 of the exemplary wireless communication system 2 of FIG. 1. In general, pulse generator 10 processes data stream 9 of information-bearing symbols to generate a burst of symbols. In some embodiments, pulse generator 10 inserts training symbols into each burst of symbols. For example, K training symbols may be inserted as a preamble to each burst. Pulse shaping unit 12 outputs a stream of short pulses to form UWB transmission waveform 11 as given in equation (1) from the burst of symbols. Transmission waveform 11 is a continuous-time waveform carrying the pulse-shaped pulses through channel 6. Channel 6 provides multiple paths for transmission waveform 11, and noise η(t) 14 is modeled as AWGN and includes MUI.

The received UWB waveform 15 is given according to equation (5). Receiver 8 does not know when transmitter 4 began transmitting or the propagation delay of channel 6. Consequently, receiver 8 timing synchronization unit 14 turns on when a change in energy is detected in received waveforms 15. Timing synchronization unit 14 operates on segments of received waveform 15 of duration $T_s$ starting at time $(t_3 + nT_f + mT_s)$ for integers $n \in [0, N_f)$ and $m \in [0, M-1]$ with $MT_s$ being the observation interval. Equation (11) expresses this waveform with noise ignored for simplicity. The noise free received wave form can then be expressed according to equation (12) using the definition of $t_3$ in equation (13) and defining the aggregate delay, i.e. delay through the aggregate channel, in equation (14).

$$\chi_{n,m}(t) = x(t + mT_s + nT_f + t_3), t \in [0.T_s) \quad (11)$$

$$\chi_{n,m}(t) = \sqrt{E} \sum_{k=0}^{+\infty} s(k) \sum_{n_f=0}^{n_f-1} \sum_{l=0}^{L} \alpha_l p(t - D_{k,n,m}) \quad (12)$$

$$t_3 = NT_s + \varepsilon \quad (13)$$

$$D_{k,n,m} = (k - N - m)T_s - (nT_f + \varepsilon) \quad (14)$$

Because p(t) has finite support over the interval (0, $T_p$) only a finite number of k values contribute non zero summands in equation (10). The k values are determined by equations (15, 16)

$$\varepsilon + nT_f \in [0,T_s) \Rightarrow k = N + m + [0,1] \quad (15)$$

$$\varepsilon + nT_f \in [T_s, 2T_s) \Rightarrow k = N + m + [1,2] \quad (16)$$

Expressing ($nT_f + \varepsilon$) as an integer multiple of $T_s$ plus a residue gives equations (17, 18) respectively where $n_o$ has possible values of 0 and 1 and $\varepsilon_0$ has possible values of [0, $T_s$).

$$n_0 := (\varepsilon + nT_f)/T_s \quad (17)$$

$$\varepsilon_0 : \varepsilon = nT^f - n_0 T_s \quad (18)$$

Using equations (17, 18) equations (15, 16) give k=N+ m+$n_0$+[0,1], $\varepsilon \forall \varepsilon_0 \in$ [0, $T_f$). Consequently equation (12) can be rewritten according to equation (19).

$$\chi_{m,n}(t) = \sum_{k=0}^{1} s(k + N + m + n_0) p_R(t - kT_s + \varepsilon_0) \quad (19)$$

The $p_R(t-kT_s+\varepsilon_0)$ depends only on $\varepsilon$ and n, but is independent of N, m, and $n_0$. In other words, as m changes $p_R(t-kT_s+\varepsilon_0)$ remains invariant for any given n and $\varepsilon$.

Timing synchronization unit 14 performs a cross correlation between successively observed waveforms $x_{n, m}(t)$, each of duration $T_s$, to acquire $n_\varepsilon$. Integrating over one symbol duration $T_s$, the correlation between successive waveforms $x_{n, m}(t)$ and $x_{n, m+1}(t)$ is given by equation (20). From equation (20) the timing synchronization with data-aided dirty templates is designed below with the description of blind time synchronization using dirty templates following.

$$R_{\chi\chi}(n; m) := \int_0^{T_s} \chi_{n,m}(t)\chi_{n,m+1}(t)dt = \quad (20)$$

$$E \int_0^{T_s} \sum_{k=0}^{1} s(k + N + m + n_0) p_R(t - kT_s + \varepsilon_0) \times$$

$$\sum_{k=0}^{1} s(k + N + m + n_0 + 1) p_R(t - kT_s + \varepsilon_0) dt$$

Timing synchronization unit 14 uses data-aided dirty templates to increase performance of estimating the timing offset. In some embodiments, training symbols are transmitted at the beginning of each burst to enable timing synchronization unit 14 to estimate the timing offset. As a result, the recovery techniques performed after such timing synchronization will not be substantially affected by the timing offset. Transmitting training symbols reduces the bandwidth of the UWB system, but increases the performance. Therefore, minimizing the number of training symbols results in an optimal trade-off between performance and bandwidth efficiency in data-aided timing synchronization. The techniques described here allow a minimum number of four symbols to be used. In some embodiments, the minimum number of symbols used is four.

In order to find the minimum number of training symbols, equation (20) is rewritten as equation (21) with coefficients A, B, and C defined in equations (22, 23) respectively. In order to minimize the number of training symbols, which results in a low complexity implementation of receiver 8, the dependence of $R_{xx}(n; m)$ on N, m, and $n_0$ is removed.

$$R_{xx}(n;m) = A\int_0^{T_s} p_R^2(T+\varepsilon_0)dt + B\int_0^{T_s} p_R^2(t-T_s+\varepsilon_0)dt \quad (21)$$

$$A := E \cdot s(N+m+n_0)s(N+m+n_0+1) \quad (22)$$

$$B := E \cdot s(N+m+n_0+1)s(N+m+n_0+2) \quad (23)$$

Using the training sequence given by equation (24) and using equations (22,23) the possible values of A, B, and C are given in Table (1). Therefore, the data-aided dirty template is a preamble training sequence of two positive pulses followed by two negative pulses of unit amplitude that is received by receiver 8. Receiver 8 observes successive waveforms over a symbol duration as previously described. Due to the timing offset, the symbol duration long waveforms will include a fraction of two training symbols. However, receiver 8 incrementally correlates successive waveforms over a symbol duration and peak-picks the increment with the greatest result.

$$s(k) = \begin{cases} +1, & \text{if}(k \bmod 4) = 0, \text{ or, } 1 \\ -1, & \text{if}(k \bmod 4) = 2, \text{ or } 3 \end{cases} \quad (24)$$

In some embodiments, the size of the increment is adjusted to achieve coarse timing synchronization, also referred to as acquisition, by incrementing at the frame level to achieve an integer multiple of the symbol duration, i.e. $n_\varepsilon$, with ambiguity less than one frame duration. In other embodiments, the size of the increment is adjusted to achieve fine timing synchronization, also referred to as tracking, by incrementing at the chip level to achieve an integer multiple of the frame duration. In further embodiments, the size of the increment is a non-integer value and timing synchronization unit 14 is implemented with voltage controlled clock (VCC) circuitry.

TABLE 1

| | | | | |
|---|---|---|---|---|
| s(N + m + $n_0$) | +1 | +1 | −1 | −1 |
| s(N + m + $n_0$ + 1) | +1 | −1 | −1 | +1 |
| s(N + m + $n_0$ + 2) | −1 | −1 | +1 | +1 |
| A | +E | −E | +E | −E |
| B | −E | +E | −E | +E |

TABLE 1

| | | | | |
|---|---|---|---|---|
| s(N + m + $n_0$) | +1 | +1 | −1 | −1 |
| s(N + m + $n_0$ + 1) | +1 | −1 | −1 | +1 |
| s(N + m + $n_0$ + 2) | −1 | −1 | +1 | +1 |
| A | +E | −E | +E | −E |
| B | −E | +E | −E | +E |

Table 1 explicitly shows all possible values of A, B, and C. The absolute value of $R_{xx}(n; m)$ remains invariant for all m, N, and $n_0$ and is given by equation (25) where the last equality is obtained through a change of variables. Because the symbol waveform $p_R(t)$ contains $N_f$ monocycles, the first integral corresponds to monocycles with indices from $\lfloor \epsilon_0/T_f \rfloor - 1$ to $N_f - 1$ while the second integral corresponds to monocycles with indices from 0 to $\lfloor \epsilon_0/T_f \rfloor$. In the absence of TH codes, i.e. $c_{nf}=0$, $\forall n_f \in [0, N_f - 1]$, the two integrals in equation (25) can be expressed in closed form respectively as given in equations (26, 27) where $E_h(\tau)$ is given in equation (28) and $\epsilon_1$ is given in equation (29).

$$R_{\chi\chi}(n) := \qquad (25)$$

$$|R_{\chi\chi}(n;m)| = E \cdot \left| \int_0^{T_s} p_R^2(t+\varepsilon_0)dt - \int_0^{T_s} p_R^2(t-T_s+\varepsilon_0)dt \right| =$$

$$E \cdot \left| \int_{\varepsilon_0}^{T_s} p_R^2(t)dt - \int_0^{\varepsilon_0} p_R^2(t)dt \right|$$

$$\int_{\varepsilon_0}^{T_s} p_R^2(t)dt = \left( N_f - \left\lfloor \frac{\varepsilon_0}{T_f} \right\rfloor \right) E_h(T_f) - E_h(\varepsilon_1) \qquad (26)$$

$$\int_0^{\varepsilon_0} p_R^2(t)dt = \left\lfloor \frac{\varepsilon_0}{T_f} \right\rfloor E_h(T_f) + E_h(\varepsilon_1) \qquad (27)$$

$$E_h(\tau) := \int_0^\tau h^2(t)dt \qquad (28)$$

$$\varepsilon_1 := (\varepsilon_0 \bmod T_f) \qquad (29)$$

However, in the presence of TH codes, the two integrals in equations (25) cannot be expressed in closed form but the two integrals do not vary much with and without TH codes for various $\epsilon_0$ values and channel realizations as will be shown in greater detail below. Substituting equations (26, 27) into equation (25) gives equation (30).

$$R_{\chi\chi}(n) = \varepsilon \cdot \left| \left( N_f - 2 \left\lfloor \frac{\varepsilon_0}{T_f} \right\rfloor \right) \varepsilon_h(T_f) - 2\varepsilon_h(\varepsilon_1) \right| \qquad (30)$$

The maximum of $R_{xx}(n)$ of equation (30) occurs at $\lfloor \epsilon_0/T_f \rfloor = 0$. Consequently, for any $\epsilon$, a unique $n_\epsilon$ can be found by peak-picking $R_{xx}(n)$ across n as shown in equation (31) by using equation (18) and noticing that $(\epsilon+nT_f) \in [0, 2T_s]$.

$$n_\varepsilon := \arg\max_n \{R_{\chi\chi}(n)\} = N_f - \left\lfloor \frac{\varepsilon}{T_f} \right\rfloor \qquad (31)$$

$$t_3 + n_\varepsilon T_f = NT_s + \varepsilon + (N_f - \lfloor \varepsilon/T_f \rfloor)T_f = \qquad (32)$$
$$(N+1)T_s + (\varepsilon \bmod T_f) = (N+1)T_s + \varepsilon_1$$

Equation (32) shows that equation (31) leads to estimating the timing offset by correcting $t_3$ with $n_\epsilon T_f$, which results in acquiring $(N+1)T_s$. Further, because $\epsilon_1 \in [0, T_f)$, the acquisition error is bounded by one frame duration, i.e. frame-level resolution. In other words, timing synchronization using dirty template with training symbols is achieved by peak-picking the absolute value of the cross correlation in equation (30) between successive waveforms $x_{n,m}(t)$ each of duration $T_s$. Correcting the starting time $t_3$ of timing synchronization unit 14 with an estimate obtained from equation (31) yields starting time $(N+1)T_s$ with error less than $T_f$.

Additionally, if $\epsilon_1$ is uniformly distributed over the interval $[0, T_s)$ then $\epsilon_1$ is uniformly distributed over the interval $[0, T_f)$. As a result, $E\{t_3+n_\epsilon T_f | t_3\}=(N+1)T_s+T_f/2$. An estimate is obtained by computing $R_{xx}(n;m)$ over pairs of $x_{n,m}(t)$ and averaging their absolute values across the M/2 pairs as given in equation (33).

$$\hat{R}_{\chi\chi}(n) = \frac{2}{M} \sum_{m=0}^{M/2-1} \left| \int_0^{T_s} \chi_{n,2m}(t) \chi_{2m+1}(t) dt \right| \qquad (33)$$

In order to carry out timing synchronization with a data-aided dirty template, M must at least be 2, i.e. m=[0, 1]. From equations (15, 16) m=1 implies $k \geq N+3$. Therefore, the minimum number of training symbols K must satisfy $K-1 \geq N+3$. In other words, N has to be bounded by $K-4$ for any given number of training symbols K.

Timing synchronization using a non-data-aided template trades-off performance for efficient bandwidth. All pulses in non-data-aided timing synchronization are information-bearing, resulting in efficient use of bandwidth. However, longer observation intervals are required to obtain the same performance as data-aided timing synchronization because the information symbols are not guaranteed to switch from positive to negative within two symbols as was designed in the data-aided technique above.

Blind timing synchronization using dirty templates follows from equation (20). Equation (20) can be rewritten as equation (34) because $\int_0^{T_s} p_R(t+\epsilon_s)p_R(t+T_s+\epsilon_s)dt$ vanishes due to the finite support of $p_R(t)$ and substitutions $\int_0^{T_s} p_R^2(t)dt = \int_0^{T_s} p_R^2(t+\epsilon_s)dt$ and $\int_0^{\epsilon_s} p_R^2(t)dt = \int_0^{T_s} p_R^2(t-T_s+\epsilon_s)dt$ ). Taking the absolute value of $R_{xx}(n;m)$ removes the dependence on the unknown symbol $s(N+m+n_s+1)$ and gives equation (35).

$$R_{xx}(n;m)=E \cdot s(N+m+n_s+1)[s(N+m+n_s) \int_{\epsilon_s}^{T_s} p_R^2(t)dt+s \qquad (34)$$
$$(N+m+n_s+2) \int_0^{\epsilon_s} p_R^2(t)dt]$$

$$|R_{\chi\chi}(n;m)|=E \cdot |s(N+m+n_s) \int_{\epsilon_s}^{T_s} p_R^2(t)dt+s(N+m+n_s+2) \qquad (35)$$
$$\int_0^{\epsilon_s} p_R^2(t)dt|$$

Moreover, with information conveying symbols $s(k) \in \{\pm 1\}$ being independent and taking the conditional expectation of the absolute value $|R_{xx}(n;m)|$ for any $n \in [0, N_f-1]$ gives equation (36).

$$R_{\chi\chi}(n) := E\{|R_{\chi\chi}(n;m)||h(t), \varepsilon\} = \qquad (36)$$

$$\frac{E}{2} \left| \int_{\varepsilon_s}^{T_s} p_R^2(t)dt - \int_0^{\varepsilon_s} p_R^2(t)dt \right| + \frac{E}{2} \int_0^{T_s} p_R^2(t)dt$$

Equation (36) removes the dependence of the absolute value $|R_{xx}(n;m)|$ on N, m, and $n_s$. However, $R_{xx}(n)$ is still dependent on n for any timing offset $\epsilon$.

As described previously with data-aided timing synchronization, the symbol waveform $p_R(t)$ contains $N_f$ monocycles. As a result, the first integral corresponds to monocycles with indices from 0 to $\lfloor \epsilon_0/T_f \rfloor - 1$ to $N_f - 1$ while the second integral corresponds to monocycles with indices from 0 to $\lfloor \epsilon_0/T_f \rfloor$. Similarly, in the absence of TH codes, i.e. $c_{nf}=0$, $\forall n_f \in [0, N_f-1]$, the two integrals in equation (26) can be expressed in closed form respectively as given in equations (27, 28) where $E_h(\tau)$ is given in equation (29) and $\epsilon_1$ is given in equation (30).

Substituting equations (27, 28) into equation (36) gives equation (37) because $\epsilon_s \in [0, T_s]$, $\lfloor \epsilon_s/T_f \rfloor$ is in the interval [0, $N_f-1$]. Consequently, the maximum of $R_{xx}(n)$ in equation (37) is given by equation (38).

$$R_{\chi\chi}(n) = \frac{E}{2}\left[\left(N_f - 2\left\lfloor\frac{\varepsilon_0}{T_f}\right\rfloor\right)E_h(T_f) - 2E_h(\varepsilon_1)\right] + \frac{E}{2}N_f E_h(T_f) \quad (37)$$

$$\max_n\{R_{\chi\chi}(n)\} = EN_f E_h(T_f) - E\min\{E_h(\varepsilon_1), E_h(T_f) - E_h(\varepsilon_1)\} \quad (38)$$

The maximum occurs at $\lfloor\varepsilon_s/T_f\rfloor=0$ if $E_h(\varepsilon_1)<E_h(T_f)/2$ and at $\lfloor\varepsilon_0/T_f\rfloor=N_f-1$ otherwise. Using the definition of $g_0$ and noticing that $n\in[0, N_f-1]$ gives piece-wise function (39).

$$\operatorname*{argmin}_n\{R_{\chi\chi}(n)\} = -\lfloor\varepsilon/T_f\rfloor = 0 \text{ when } \varepsilon = 0 \quad (39)$$

and $$\operatorname*{argmax}_n\{R_{\chi\chi}(n)\} =$$

$$\begin{cases} ((N_f - \lfloor\varepsilon/T_f\rfloor)\bmod N_f) \\ N_f - \lfloor\varepsilon/T_f\rfloor - 1 \end{cases} \text{ if } \begin{cases} E_h(\varepsilon_1) < E_h(T_f)/2 \\ \text{otherwise} \end{cases} \text{ when } \varepsilon > 0$$

Equation (39) peak picks $R_{xx}(n)$ across n for any $\varepsilon$. In other words, $\arg\max_n \{R_{xx}(n)\}$ gives $n_\varepsilon$ because by correcting $t_3$ with the number of frames given by equation (39), either $NT_s$ or $(N+1)T_s$ is acquired with ambiguity$<T_f$. Table 2 explicitly lists the possible values of $t_3+\arg\max_n \{R_{xx}(N)\}T_f$.

TABLE 2

| | $E_h(\varepsilon_1) < \varepsilon_h(T_f)/2$ | $E_h(\varepsilon_1) > E_h(T_f)/2$ |
|---|---|---|
| $\varepsilon = 0$ | $NT_s$ | Impossible |
| $\varepsilon \in (0, T_f)$ | $NT_s + \varepsilon_1$ | $(N + 1)T_s + (\varepsilon_1 - T_f)$ |
| $\varepsilon \in [T_f, T_s)$ | $(N + 1)T_s + \varepsilon_1$ | $(N + 1)T_s + (\varepsilon_1 - T_f)$ |

Similar to data-aided timing synchronization, equation (33) estimates $R_{xx}(n;m)$ by computing $R_{xx}(n;m)$ over pairs of $X_{n,m}(t)$ each of duration $T_s$, and averaging the resulting values across the M/2 pairs. Peak-picking equation (33), i.e.

$$n'_\varepsilon = \operatorname*{argmax}_n\{\hat{R}_{xx}(n)\}$$

allows $t_3$ to be corrected with $\hat{n}_\varepsilon T_f$ results and results in an estimate of a symbol starting time. Equation (33) is not limited to an integer output and synchronization unit 14 can be implemented with VCC circuits.

Timing synchronization unit 14 estimates the timing offset and initiates channel estimator 16 at the start of the first symbol of received waveform 15 after $t_3$ with resolution determined by the number of increments. Channel estimator 16 reduces the effects of channel 6, including attenuation and multipath effects. Matched filter 17 receives the output of channel estimator 16 and separates multiple users of communication system 2. Sampling unit 18 samples the output of matched filter 17 producing an output of symbols. Symbol detector 19 performs symbol detection on the output of matched filter 17 producing a stream of symbol estimates 20.

Figure 3:
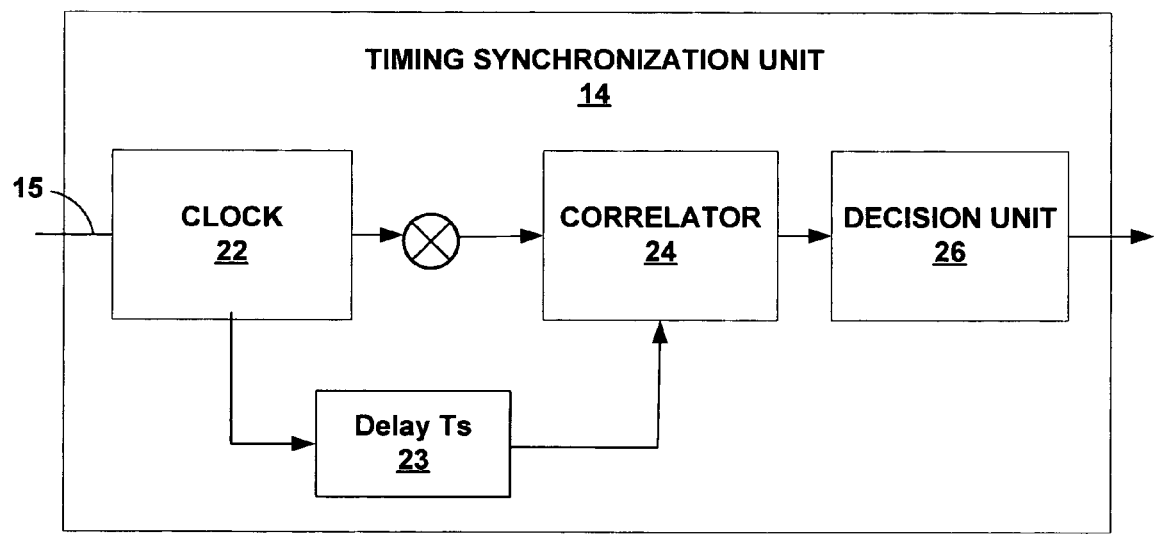
FIG. 3 is a block diagram illustrating an example embodiment of a timing synchronization unit within a receiver.

FIG. 3 is a block diagram illustrating an example embodiment of timing synchronization unit 14 of receiver 8 (FIG. 2). For purposes of illustration, timing synchronization unit 14 employs data-aided timing synchronization. Clock 22 receives waveform 15 and initiates data-aided timing synchronization when a change in amplitude of received waveforms 15 is detected. Clock 22 multiplies the received waveform by delay $T_s$ 23 and correlator 24 correlates M/2 successive symbol duration waveform pairs via equations (30) starting at time $t_3$. Clock 22 multiplies $t_3$ by a selectable value, such as a frame duration, i.e., $t_3'=t_3+T_f$, until $t_3$ is incremented by a symbol duration $t_3'=t_3+T_s$. Correlator 24 correlates M/2 successive symbol duration waveform pairs for each incremented time value $t_3'$. Decision unit 26 receives the output of correlator 24 for each time value and selects the increment value that resulted in the greatest correlation according to equation (30). Equation (24) employs a training sequence such that the greatest correlation occurs when the M/2 pairs of waveforms are each of opposite polarity. Equation (18) implies that by correcting $t_3$ with $n_\varepsilon T_f$ $(N+1)T_s$ is obtained. Additionally, because $\varepsilon_1 \in [0, T_f)$, the acquisition error is bounded by one frame duration. Using similar techniques, fine timing synchronization can be achieved with variable non-integer increments.

The embodiment of timing synchronization unit 14 is described for exemplary purposes only. A substantially similar timing synchronization unit may be employed for non-data-aided timing synchronization. Such a timing synchronization unit would correlate M/2 successive symbol duration waveforms pairs. However, instead of correlating dirty templates of training symbols, the non-data-aided timing synchronization unit would correlate dirty templates of information symbols. Because training symbols are not being transmitted, non-data-aided timing synchronization results in increased bandwidth efficiency. However, to achieve similar performance as the data-aided timing synchronization technique M is generally a larger value, resulting in a slower acquisition time and increased complexity.

Figure 4:
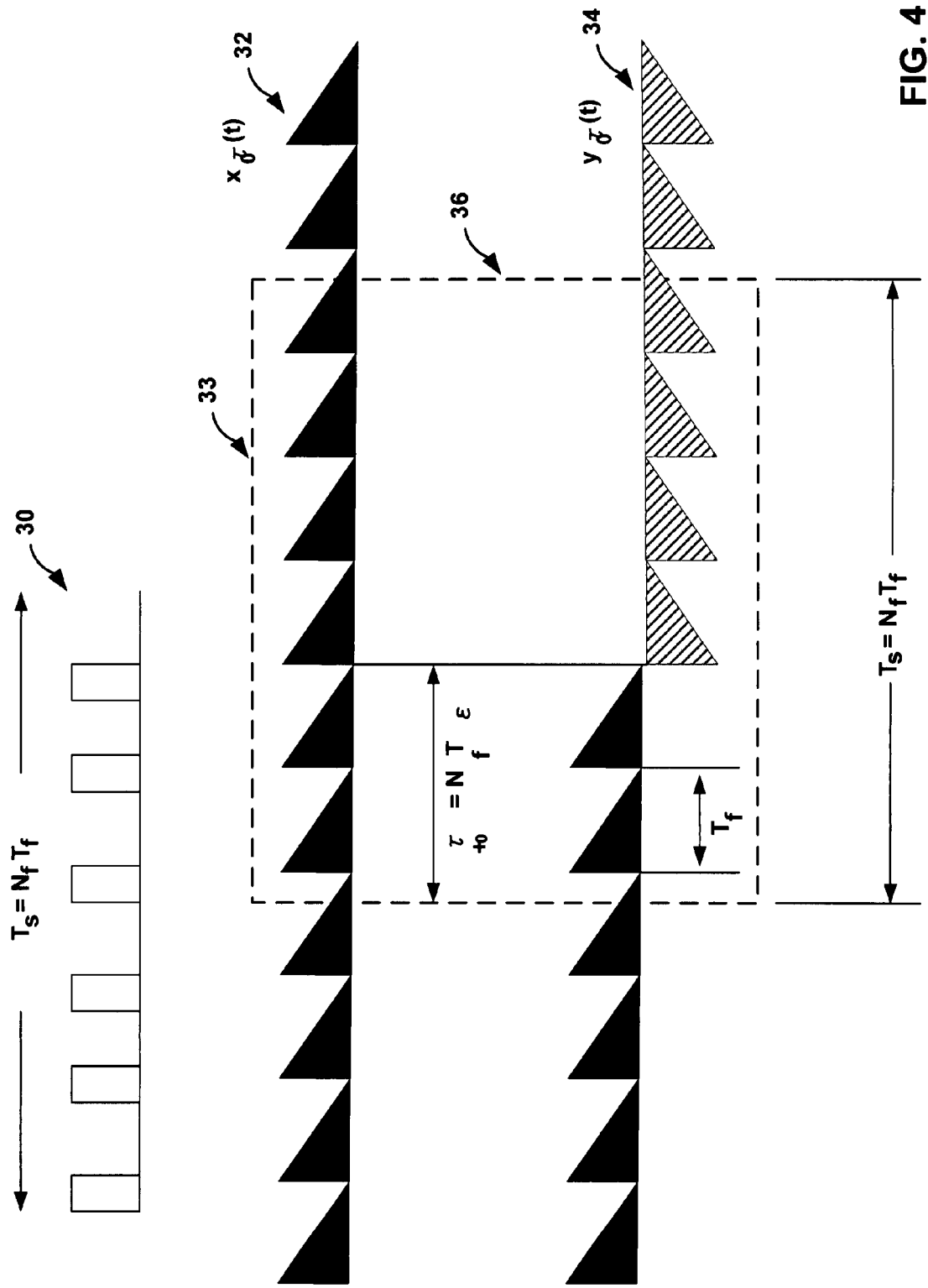
FIG. 4 is a timing diagram illustrating exemplary symbol-long waveform segments observed by a receiver for two separate received waveforms.

FIG. 4 is a timing diagram illustrating exemplary waveform segments of duration $T_s$ for two separate received waveforms 32 and 34 which are observed by receiver 8 of communication system 2. For illustrative purposes, supplemental notation for describing timing synchronization with dirty templates is introduced in the following sections. The notation introduced in relation to the following figures should not be taken as contradictory to the previous notation or as limiting the previous notation. Rather, the supplemental notation should be viewed as supporting the following figures and substantially strengthening a conceptual illustration of timing synchronization with dirty templates.

For reference, exemplary received symbol 30 with symbol duration $T_s=N_f T_f$ includes $N_f=6$ pulses, each with duration $T_f$, transmitted by transmitter 4. Equation (40) expresses exemplary symbol 30 in terms of the aggregate channel given in equation (4). Waveforms 32 and 34 each include two UWB symbols with received pulses represented as triangles to indicate the time spreading multipath effects of channel 6. Positive pulses are represented by pulses with a solid fill, while negative pulses are represented by pulses with a cross-hatch fill. Waveform 32, denoted $x_{\tau_0}(t)$ as given in equation (41), includes the pulses, which are all positive, within window 33. Window 33 is of one symbol duration $T_s$. Waveform 34, denoted $y_{\tau_0}(t)$ as given in equation (42), includes the received pulses, positive pulses followed by negative pulses, within window 33. Interval 36 has duration $T_s$ and begins when receiver 8 detects an increase in the amplitude of received waveforms. The timing offset created by the difference in time between the time at which interval 36 begins and when the next symbol starts is given by $\tau_0=n_\varepsilon T_f+\varepsilon$.

Even in the presence TH and unknown multipath, least-squares (LS) optimal timing estimation is given by equation (43). Peak-picking the cross correlation of $T_s$ long received segments of waveforms 32 and 34 allows timing acquisition and tracking in one step or in separate steps at any desirable resolution. Waveforms 32 and 34 guarantee LS estimation of timing off set $\tau_0$ via equation (43).

$$h_s(t) = \sum_{n=0}^{N_f - 1} h(t - nT_f) \quad (40)$$

$$x_{\tau_0} = h_s(t - \tau_0 + T_s) + h_s(t - \tau_0) \quad (41)$$

$$y_{\tau_0} = h_s(t - \tau_0 + T_s) - h_s(t - \tau_0) \quad (42)$$

$$\hat{\tau}_0 = \operatorname*{argmax}_\tau E\left\{\left|\int_0^{T_s} x_{\tau_0}(t+\tau) y_{\tau_0}(t+\tau) dt\right|\right\} = \quad (43)$$

$$\left|\int_0^{T_s + (\tau - \tau_0)} h_s^2(t) dt - \int_{T_s + (\tau - \tau_0)}^{T_s} h_s^2(t) dt\right|$$

Figure 5:
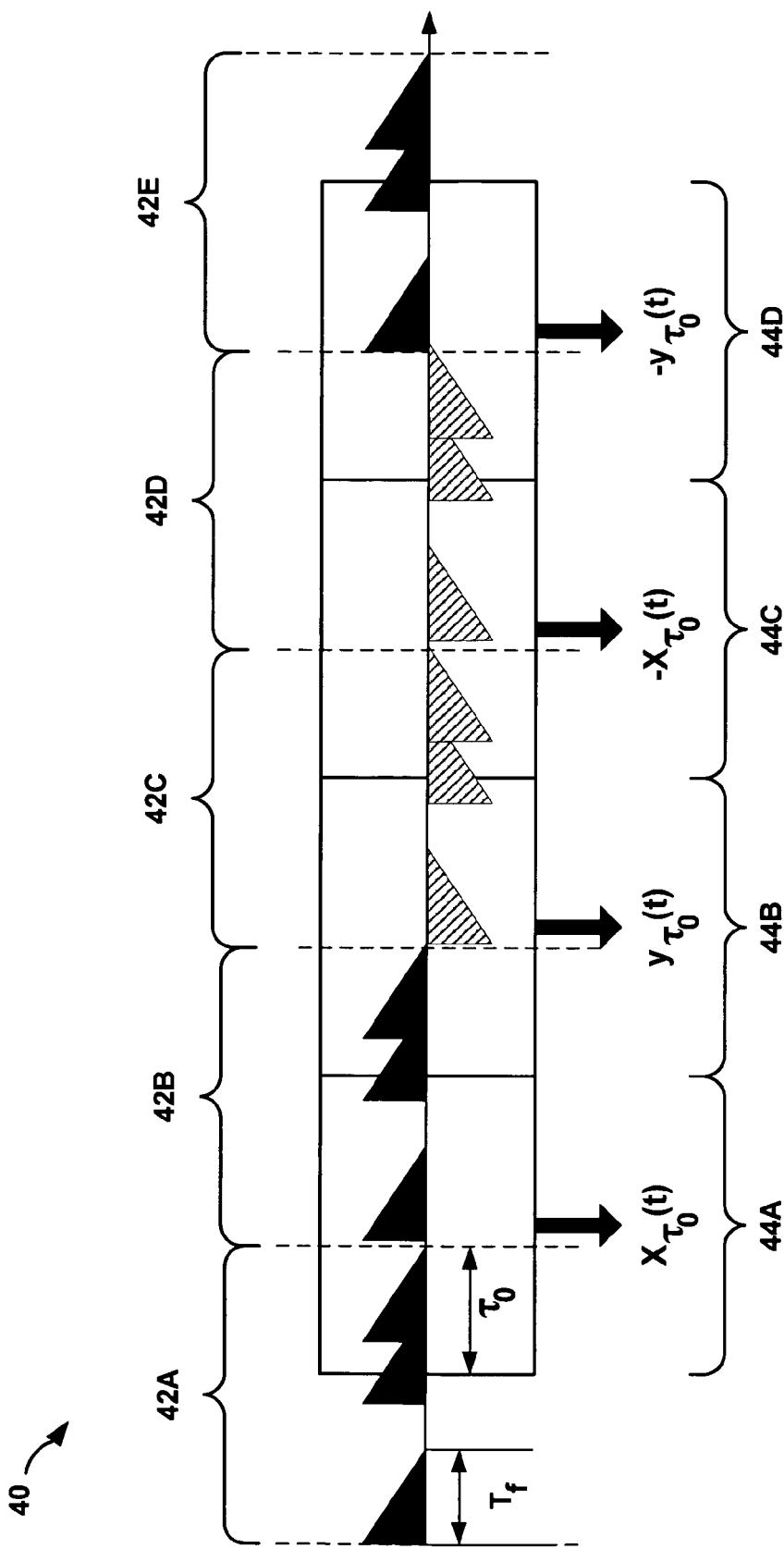
FIG. 5 illustrates an example waveform with pairs of symbols alternating between positive polarity and negative polarity for data-aided timing synchronization with dirty templates.

FIG. 5 is a timing diagram illustrating an example waveform 40 with pairs of symbols alternating between positive and negative polarity which can be used as a training sequence for data-aided timing synchronization with dirty templates in communication system 2. Waveform 40 includes $N_f=3$ received pulses with duration $T_f$ per symbol which are represented by triangles to illustrate the multipath effects of channel 6 time spreading the energy of a transmitted pulse. The pulses of waveform 40 are also subject to time-hopping within each symbol interval of duration $T_s$ 42A-42E. Waveform segments 44A-44D are of symbol duration $T_s$ and are expressed in terms of waveforms 32 and 34 with positive pulses illustrated having solid fill, while negative pulses are illustrated having a cross-hatch fill. The timing offset created by the difference in time between the beginning of interval 36 and start of the next symbol interval is given by $\tau_0 = n_\epsilon T_f + \epsilon$.

Waveform 40 is designed according to equation (25) such that pairs of positive symbols and pairs of negative symbols are transmitted alternately. Consequently, equation (43) is used to estimate timing offset $\tau_0$.

Figure 6:
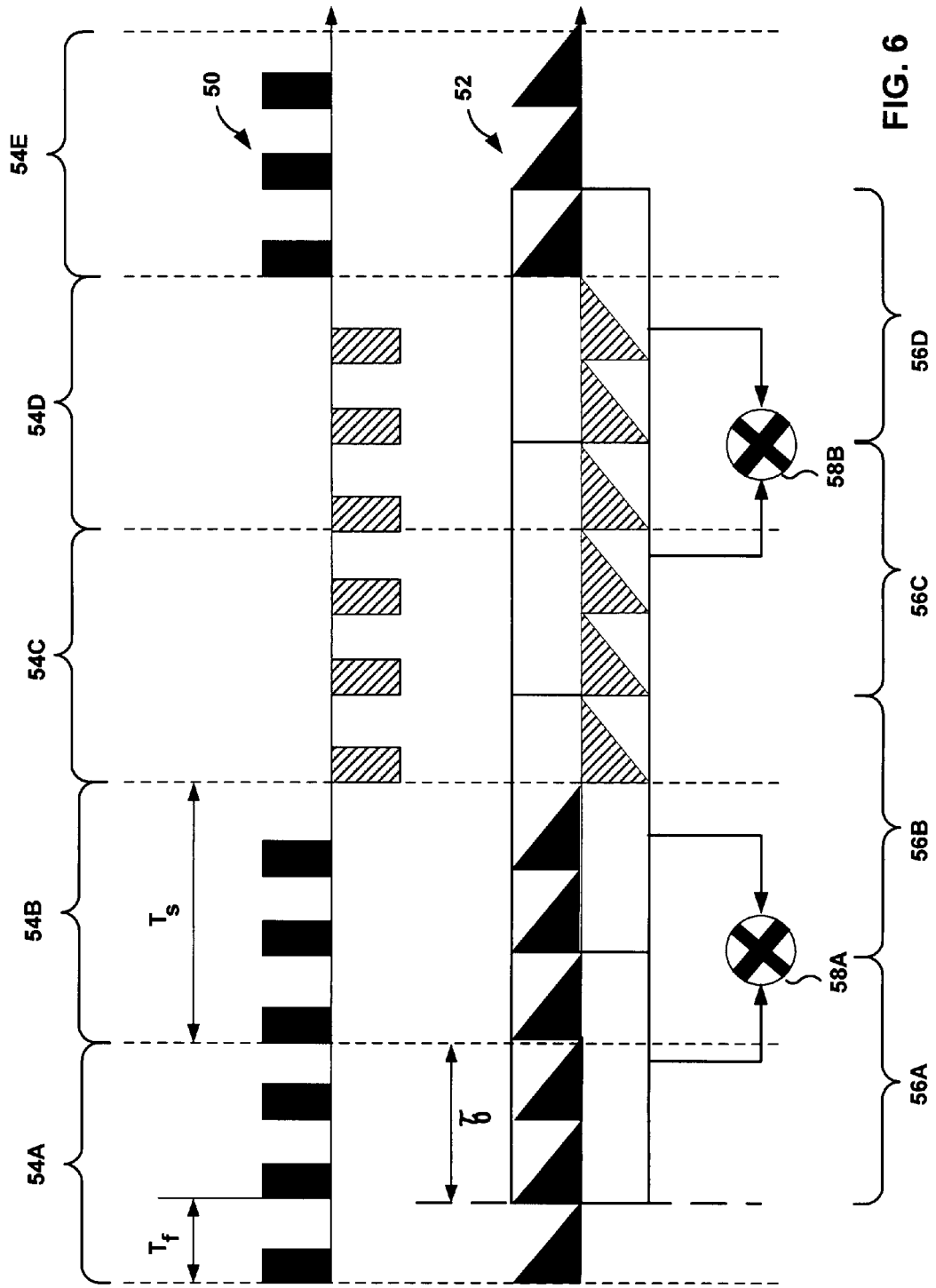
FIG. 6 illustrates an exemplary mode of operation of the timing synchronization unit of FIG. 3 using the data-aided timing synchronization with the dirty template waveform of FIG. 5.
Figure 7:
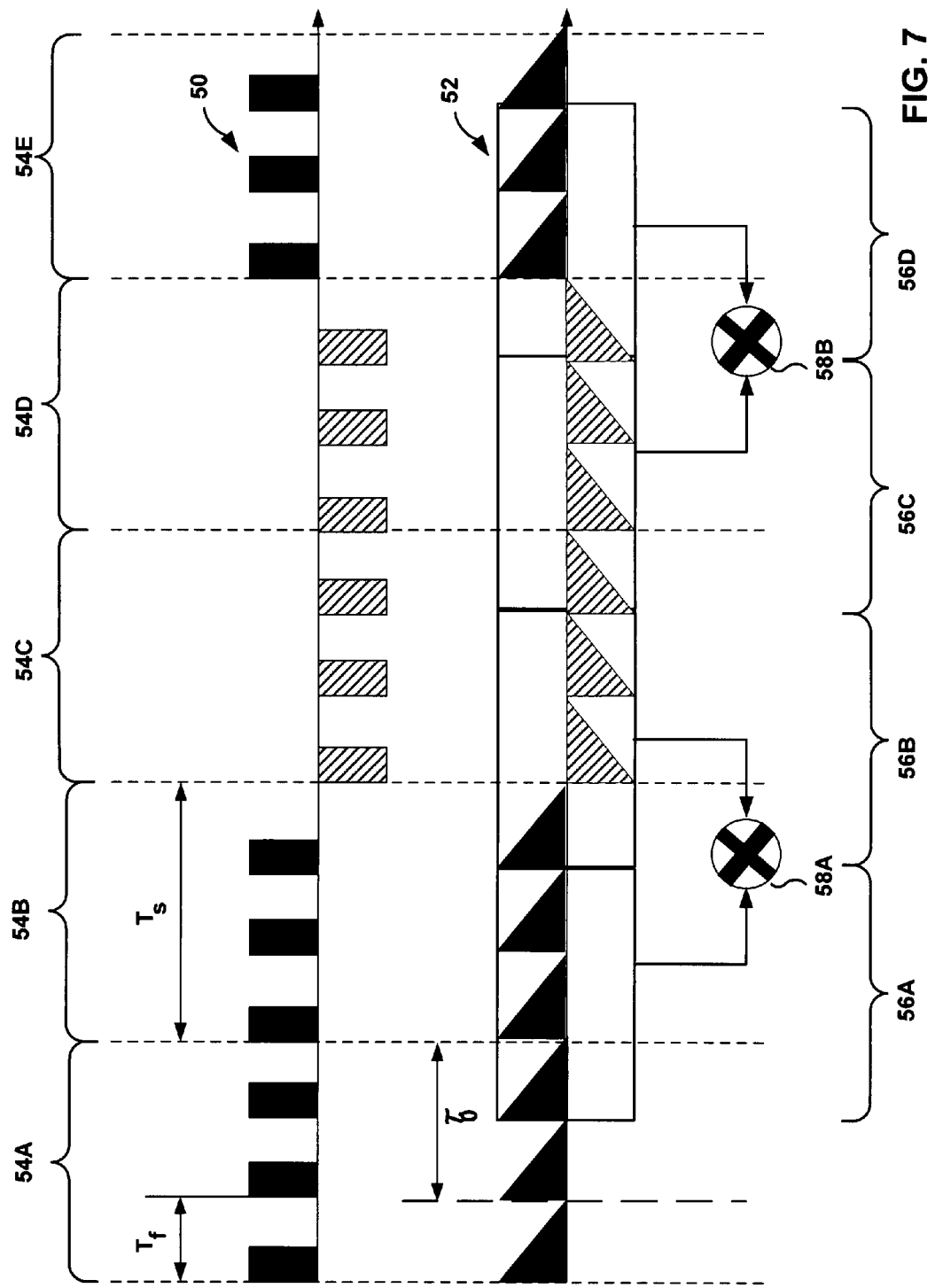
FIG. 7 illustrates the second step of the data-aided timing synchronization of FIG. 6.
Figure 8:
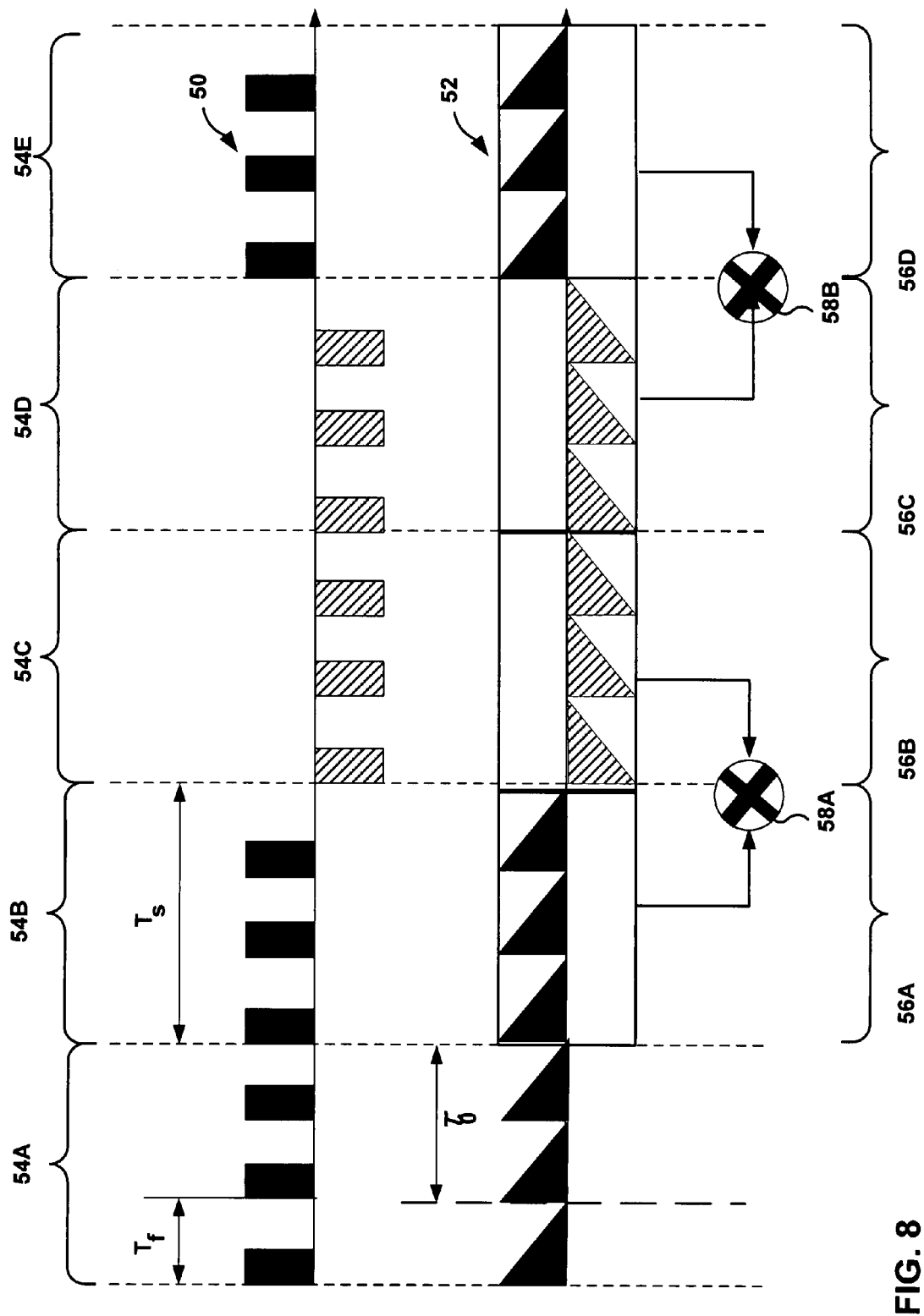
FIG. 8 illustrates the third step of the data-aided timing synchronization of FIG. 6.

FIGS. 6-8 are timing diagrams that illustrate an exemplary mode of operation of timing synchronization unit 14 employing data-aided timing synchronization with dirty templates as designed in FIG. 5. Transmitted waveform 50 includes $N_f=3$ pulses per symbol represented by rectangles to illustrate the impulse-like nature of waveform 50. Alternating pairs of positive polarity and negative polarity pulses are transmitted as designed in equation (23). As in FIG. 5, positive symbols with are illustrated having solid fill, while negative pulses are illustrated having a cross-hatch fill.

Waveform 50 transmits symbols such that each segment 54A-54E has duration $T_s$ and defines a discrete information-bearing symbol. Waveform 50 propagates through channel 6 and is received by receiver 8 as waveform 52. The triangular pulses of waveform 52 includes pulses illustrating the multipath effects of channel 6 which spreads the energy of the transmitted pulse in time. Although time-hopping is not illustrated in FIGS. 6-8, employing time-hopping does not create any limitations. Receiver 8 estimates timing offset $\tau_0$ by operating on symbol long segments 56A-56D of waveform 52. Symbols 58A, 58B indicate cross correlation according to equation (44).

FIG. 6 illustrates the first cross correlation of two pairs of successive segments (56A, 56B) and (56C, 56D) of waveform 52. Equation (44) is used to calculate the averaged absolute value of cross correlation of the successive segments. M=3 represents the 4 symbol duration segments of waveform 52 and n=0 represents the number of increments. Consequently, equation (44) represents a value of $E_h$.

$$\bar{I}(n) := \frac{1}{M} \sum_{m=0}^{M-1} \left| \int_0^{T_s} x_{\tau_o}^{(m)}(t + nT_f) y_{\tau_o}^{(m)}(t + nT_f) dt \right| \quad (44)$$

FIG. 7 illustrates the cross correlation of successive segments (56A, 56B) and (56C, 56D) of waveform 52 after receiver 8 increments the starting time of the successive segments by one frame duration $T_f$. Equation (44) outputs a value of $E_h$ for M=4 and n=1.

FIG. 8 illustrates the cross correlation of successive segments (56A, 56B) and (56C, 56D) of waveform 52 after receiver 8 increments the starting time of the successive segments by one frame duration $T_f$. Equation (44) outputs a value of $3 E_h$ for M=4 and n=2 because all the pulses in each symbol long segment are of the same polarity and of opposite polarity of the segment with which it is correlated. This result is consistent with Table 1. Equation (45) outputs the value $n_\epsilon = 2$ by peak-picking equation (44) across n.

$$\hat{n}_\varepsilon = \operatorname*{argmax}_n E\{|\bar{I}(n)|\} \quad (45)$$

Figure 9:
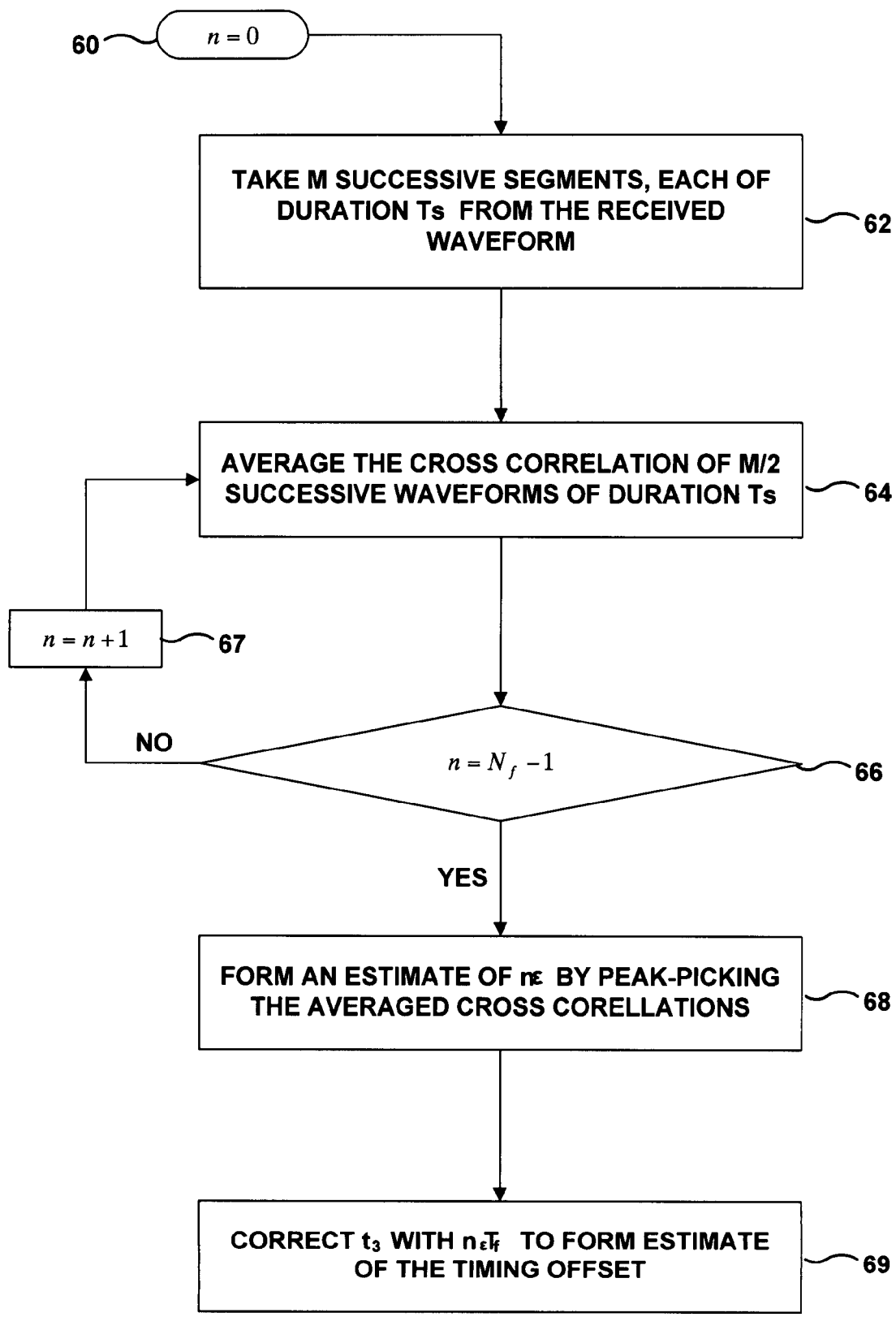
FIG. 9 is a flow chart illustrating an exemplary mode of operation of a communication system in which data-aided timing synchronization is performed with dirty templates.

FIG. 9 is a flow chart illustrating an example mode of operation of timing synchronization unit 14 of receiver 8 using data-aided timing synchronization with dirty templates. For each received burst, n is set equal to zero (step 60) so that receiver 8 initiates timing synchronization as soon as received waveforms are detected. M successive segments, each of duration $T_s$, are taken from the received waveform (step 62). M/2 successive pairs are then cross correlated (step 64) and timing synchronization unit 14 increments n by one frame duration (step 67) based on whether successive segments have been incremented by a full symbol duration (step 66), i.e., $N_f$ iterations. In some embodiments n may be selected to acquire any desirable resolution. When the segments have been cross correlated over $N_f$ successive frame durations, an estimate of $n_\epsilon$ is formed by peak-picking the averaged cross correlations (step 68). The timing offset is estimated by correcting $t_3$ with $n_{\epsilon T_f}$ (step 69).

Figure 10:
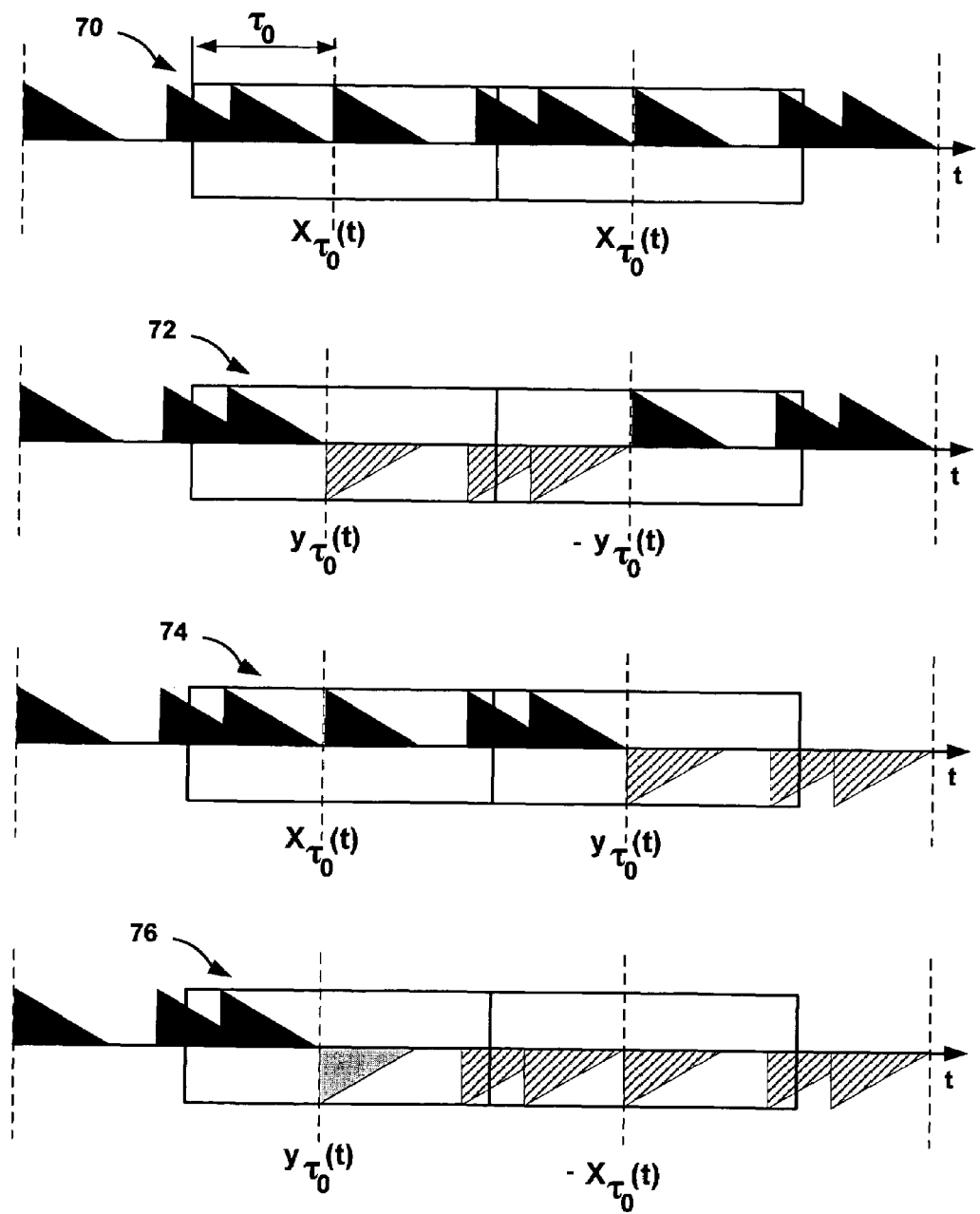
FIG. 10 illustrates successive symbol long waveform segments of a communication system employing non-data-aided timing synchronization with dirty templates.

FIG. 10 illustrates the possible successive symbol long waveform segments 72-76 of a received waveform of communication system 2 employing non-data-aided timing synchronization with dirty templates. Waveforms 72-76 can be viewed as combinations of segments defined according to equations (41, 42). For example, the successive waveforms of 70 include only positive pulses resulting in a cross correlation given by $$\left| \int_0^{T_s} x_{\tau_0}^2(t) dt \right|.$$

Although $x_{\tau_0}(t)$ is dependent on $\tau_0$, the auto-correlation of $x_{\tau_0}(t)$ is independent of $\tau_0$. Therefore, the auto-correlation of $x_{\tau_0}(t)$ is a constant in time. Equation (46) gives the average of the absolute value of the cross correlations for successive segments 70-76 with equi-probable independent identically distributed symbols. As will be shown in greater detail below through simulations, equation (46) is used in the same manner as equation (44) to provide estimates of the timing offsets. The second term of equation (46) enables non-data-aided timing synchronization with dirty templates. In this case, received information symbols are correlated with received information symbols, resulting in an increase in energy capture because the successive waveform segments propagate through the same communication channel. Consequently, there is an increase in bandwidth efficiency but a decrease in performance. Non-data-aided timing synchronization with dirty templates typically requires correlation over a greater number of successive segments to achieve the same performance as data-aided timing synchronization with dirty templates.

$$E\{|\text{succesive correlations}|\} = \frac{1}{2}\left|\int_0^{T_s} x_{\tau_0}^2(t)dt\right| + \frac{1}{2}\left|\int_0^{T_s} x_{\tau_0}(t)y_{\tau_0}(t)dt\right| \quad (46)$$

Figure 11:
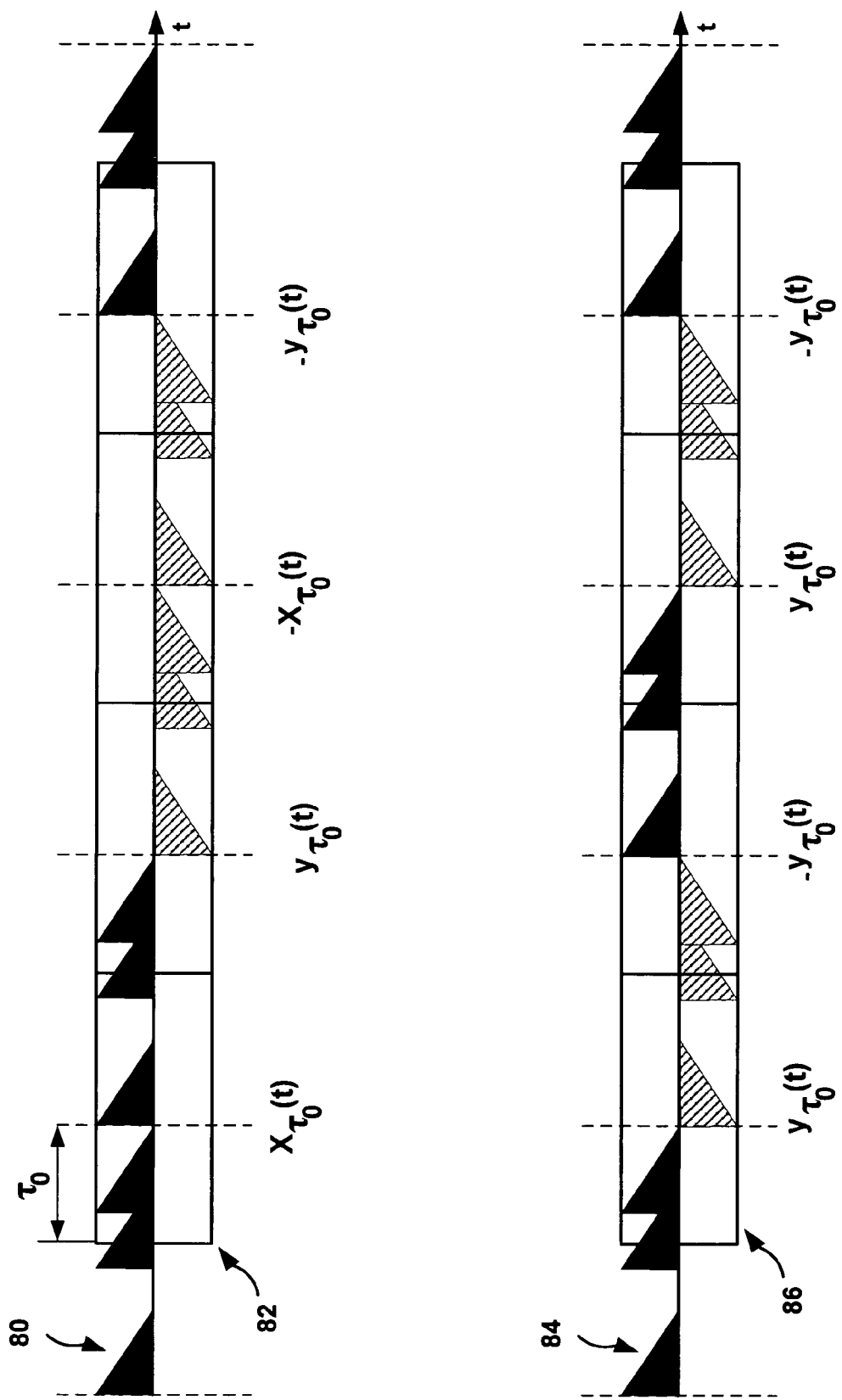
FIG. 11 illustrates an example mode of operation of a communication system employing data-aided timing synchronization with dirty templates in the presence of multiple users.

FIG. 11 is a timing diagram that illustrates exemplary waveforms when communication system 2 employs data-aided timing synchronization with dirty templates in the presence of multiple users. The desired user's waveform 80 uses the training sequence given in equation (23). Successive segments of symbol duration $T_s$ 82 within waveform 80 are guaranteed to alternate between segments of $x_{\tau_0}(t)$ and $y_{\tau_0}(t)$. However, the interferer's waveform 84 is not using the training sequence and is not guaranteed to alternate between segments of $x_{\tau_0}(t)$ and $y_{\tau_0}(t)$. Consequently, successive segments 86 of the interferer's waveform result in cross correlation equations (47, 48).

$$\pm \int_0^{T_s} x_{\tau_0}^2(t)dt \quad (47)$$

$$\pm \int_0^{T_s} x_{\tau_0}(t)y_{\tau_0}(t)dt \quad (48)$$

By taking the absolute value of the averaged cross correlations, the interferer's waveform is eliminated, leaving only the desired user as shown in equation (49).

$$\bar{I}(n) := \frac{1}{M}\left|\sum_{m=0}^{M-1}\int_0^{T_s} x_{\tau_0}^{(m)}(t+nT_f)y_{\tau_0}^{(m)}(t+nT_f)dt\right| \quad (49)$$

Figure 12:
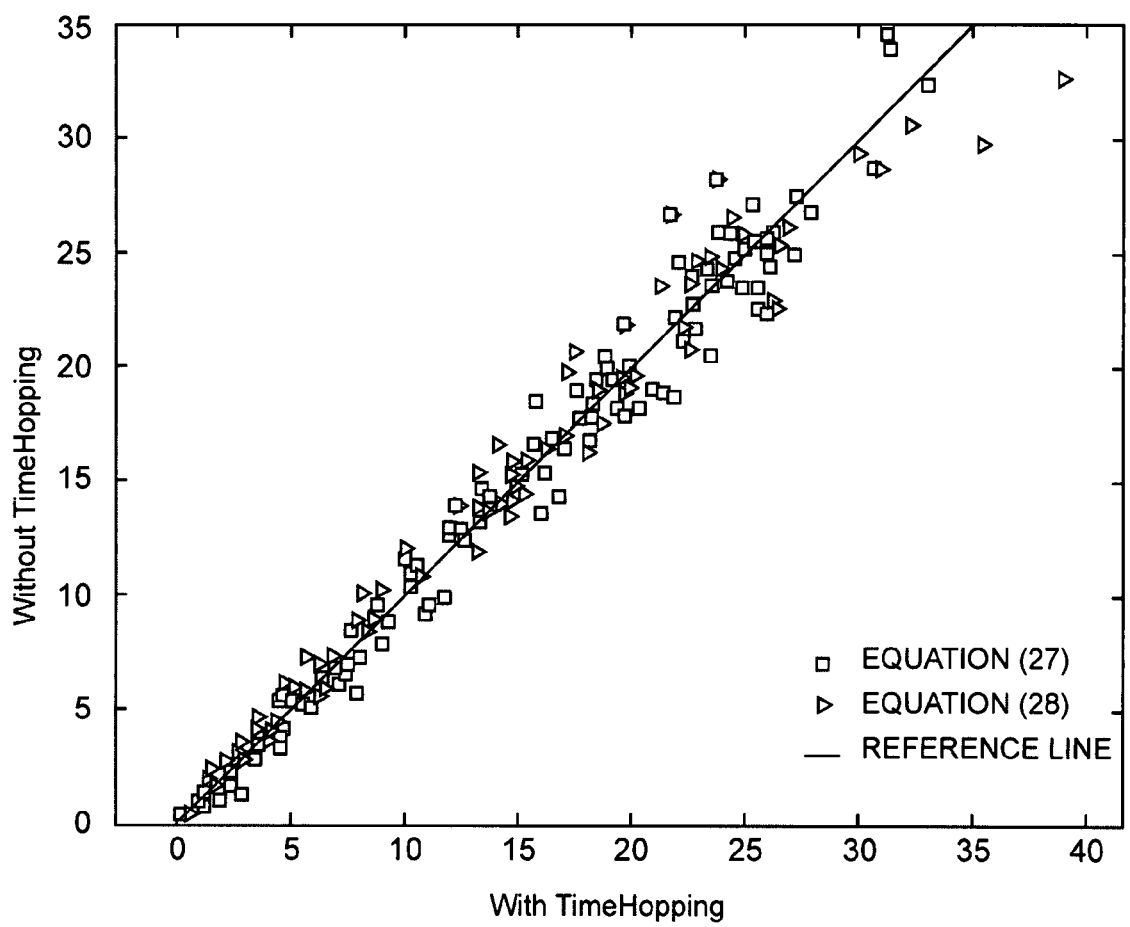
FIGS. 12-17 are graphs illustrating results of simulations and comparisons that validate analyses and designs of data-aided and non-data-aided timing synchronization with dirty templates.
Figure 13:
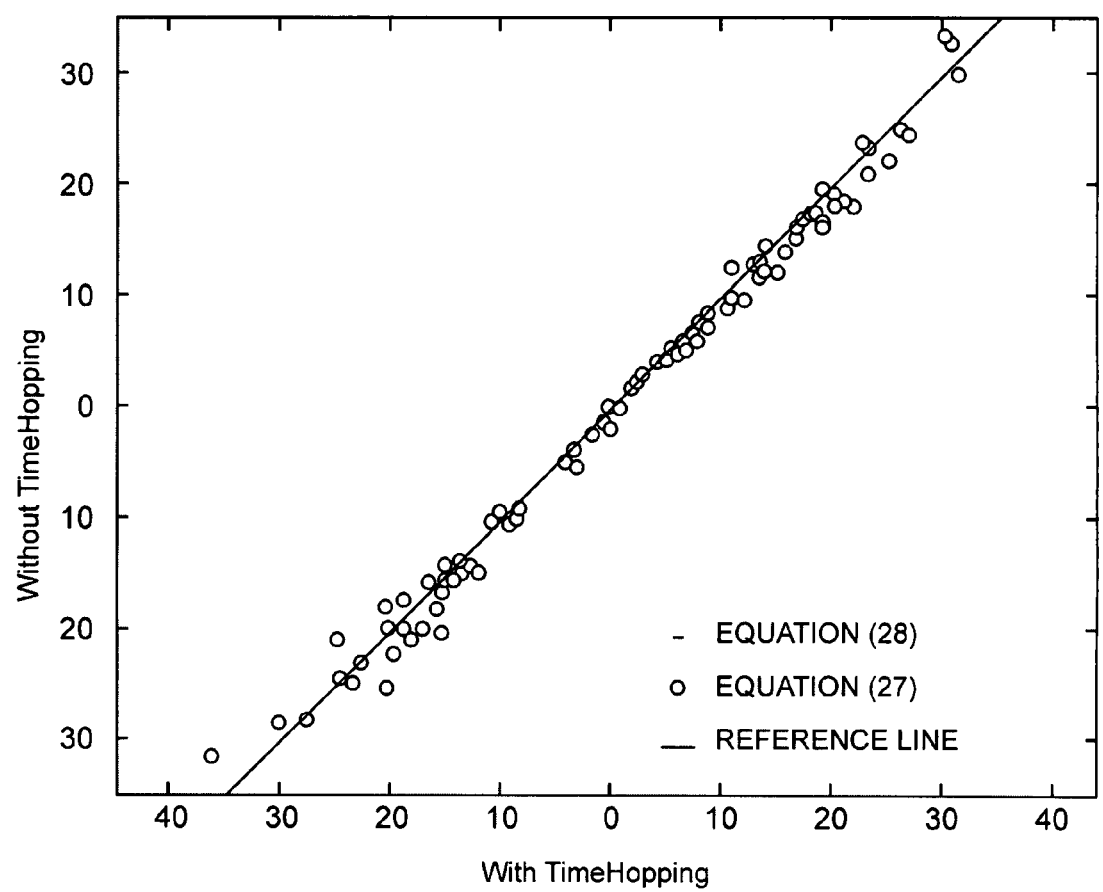

FIGS. 12 and 13 are graphs illustrating exemplary simulation results from application of equations (27, 28) with and without time-hopping codes respectively. Over 100 channel realizations are plotted for each equation. Both so and time-hopping codes are randomly generated according to a uniform distribution on intervals [0, $T_s$) and [0, $N_c$−1] with $N_c$=90 respectively. Equations (27, 28) do not vary significantly with and without time-hopping codes for various values of $\epsilon_0$ and channel realizations.

FIGS. 14-17 are graphs illustrating results of simulations and comparisons that validate analyses and designs of data-aided and non-data-aided timing synchronization with dirty templates. The simulations are carried out with the pulse p(t) selected as the second derivative of the Gaussian function with unit energy and duration $T_p\approx 1$ nanosecond (ns). Each symbol contains $N_f$=32 frames, each with duration $T_f$=100 ns. Random channels are generated where rays arrive in several clusters within an observation window. The cluster arrival times are modeled as Poisson variables with cluster arrival rate $\Lambda$. Rays within each cluster also arrive according to a Poisson process with ray arrival rate $\lambda$. The amplitude of each arriving ray is a Rayleigh distributed random variable having exponentially decaying mean square value with parameters $\Gamma$ and $\gamma$. Parameters of this channel are chosen with (1/$\Lambda$, 1/$\lambda$, $\Gamma$, $\gamma$)=(2, 0.5, 30, 5) ns. The diminishing tail of the power profile is truncated to make the maximum delay spread of the multipath channel $T_g$=99 ns. The signal-to-noise ratio (SNR) is defined as the energy per symbol (bit for binary PAM) over the noise variance and $\epsilon$ is randomly generated from a uniform distribution over [0, $T_s$). Fast TH spreading codes of period $N_f$ are generated from a uniform distribution over [0, $N_c$−1] with $N_c$=90 and $T_c$=1.0 ns, independently from frame to frame. Inter-symbol interference is avoided by setting $c_0=c_{N_f-1}=0$.

Figure 14:
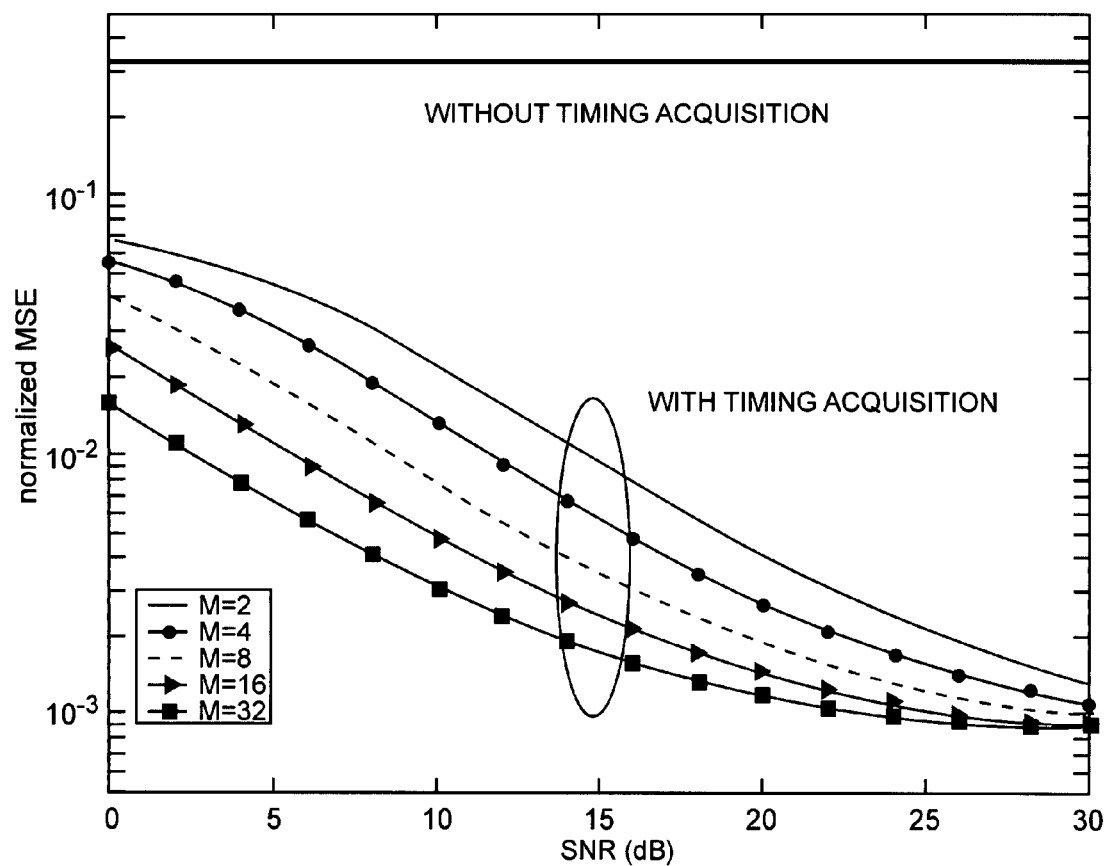
Figure 15:
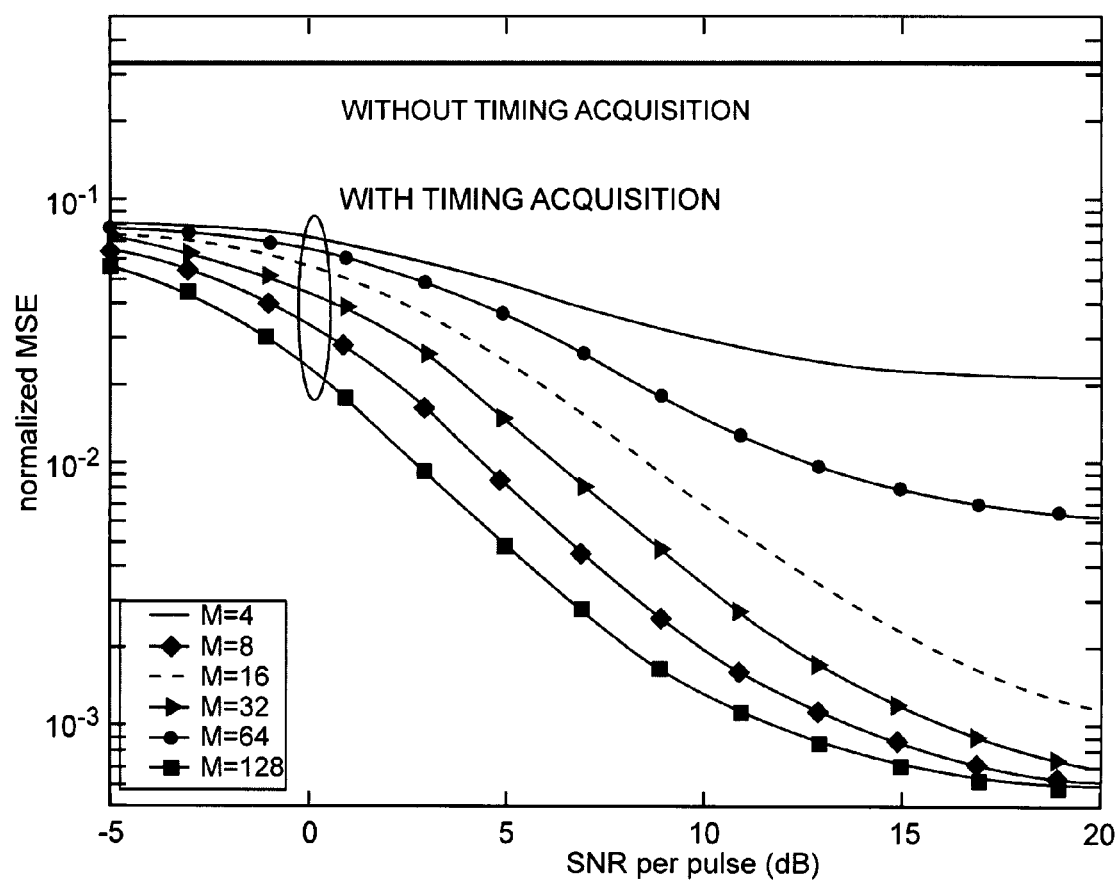

FIGS. 14 and 15 are graphs illustrating results of a comparison of mean square error (MSE) performance of data-aided and non-data-aided timing synchronization with dirty templates for various values of M, respectively. The MSE in FIGS. 14 and 15 are normalized with respect to $T_s^2$ and plotted verse the signal-to-noise ratio (SNR) per pulse. Also plotted is the normalized variance of the random timing offset without timing synchronization. In general, as M increases the normalized MSE decrease monotonically. Similarly, the MSE curves flatten as SNR increases of the frame resolution limit.

Data-aided timing synchronization techniques have higher performance than the non-data-aided techniques. For example, data-aided timing synchronization of FIG. 14 is operational with M=2, i.e. two pairs of $x_{\tau_0}(t)$ and $y_{\tau_0}(t)$, and performs significantly better than the non-data-aided M=4 case of FIG. 15. In general, non-data-aided techniques with values of M≧16 result in MSE performance similar to the performance of data-aided techniques with M/4 training symbols.

Figure 16:
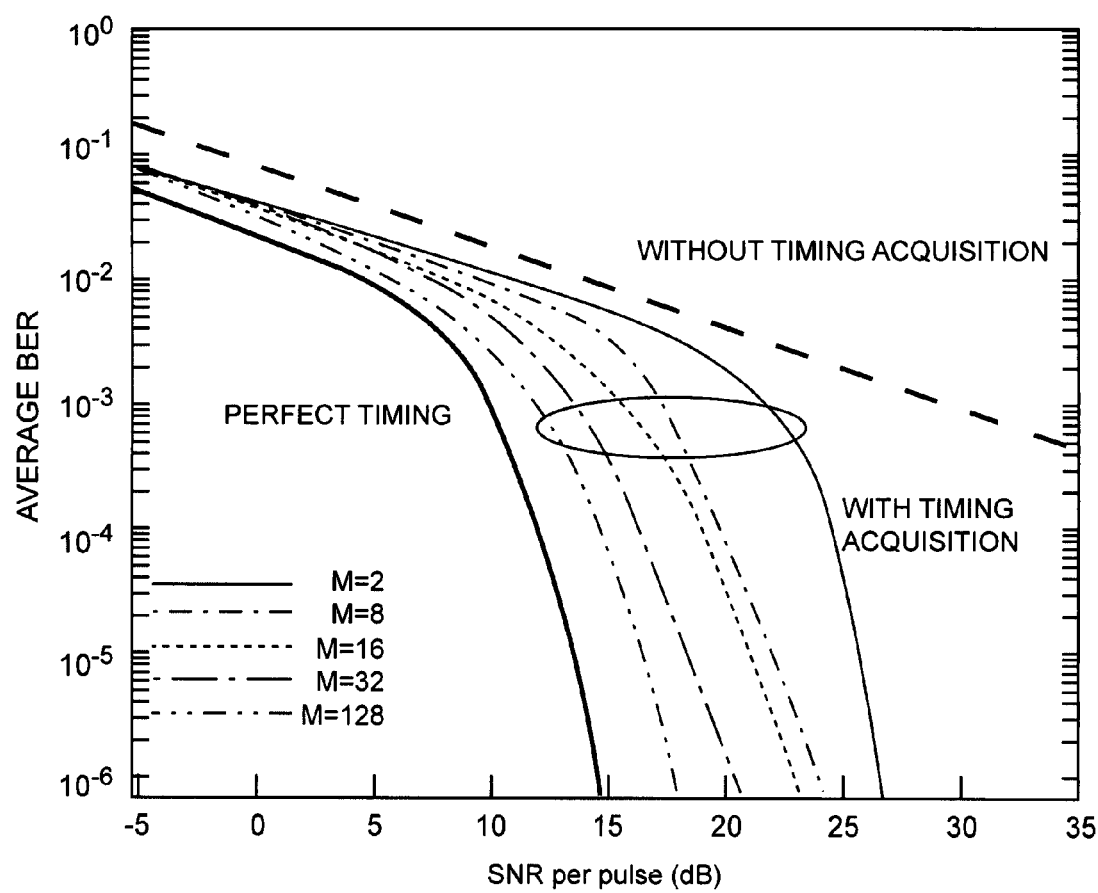
Figure 17:
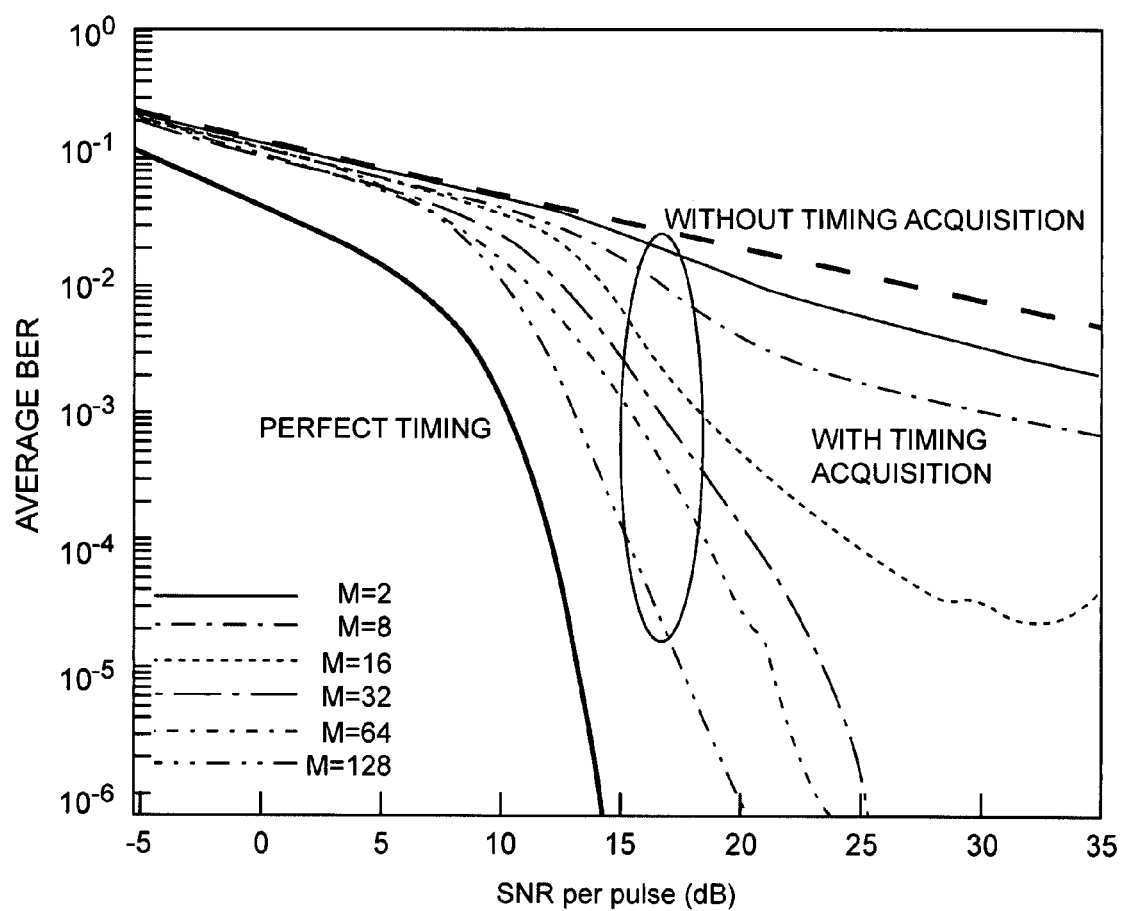

FIGS. 16 and 17 are graphs illustrating results of a comparison of bit-error-rate (BER) performance of data-aided and non-data-aided timing synchronization with dirty templates for various values of M, respectively. Also plotted are the perfect timing case and the case without timing synchronization. The channel estimate is free of errors in order to isolate timing from channel estimation. The BER performance increases monotonically as M increases in both FIGS. 16 and 17. FIG. 16 shows that data-aided timing synchronization techniques are operational with M=2, i.e. two pairs of $x_{\tau_0}(t)$ and $y_{\tau_0}(t)$, while the non-data-aided techniques require M=32 to be operational.

The described techniques may provide advantages in UWB communications systems, and non-UWB wireless communication systems where inter-symbol interference is absent or substantially reduced. In particular, the described techniques operate in realistic UWB environments, e.g., environments having the presence of noise, multipath, time-hopping, and multiple users. Timing synchronization with dirty templates peak-pick the output of a sliding correlator with a template that propagates through the wireless communication channel. Because the template propagates through the same communication channel, the resulting energy capture is higher than energy capture using a clean template, i.e., a stored segment of the transmit waveform. Selecting a data-aided, dirty template increases the performance of the described techniques. For example, a dirty template with four symbols increases the performance by reducing the number of operations performed at the receiver. However, selecting a blind, i.e. non-data-aided, template provides a more efficient use of bandwidth.

Additionally, timing synchronization can be achieved at any desirable resolution by selecting the increment at which each correlation is performed within a symbol duration. In some embodiments, voltage controlled clock (VCC) circuits can be used to implement the receiver.

The described techniques can be embodied in a variety of devices that communicate using ultra wideband communication, including base stations, mobile phones, laptop computers, handheld computing devices, personal digital assistants (PDA's), a device within a wireless personal area network, a device within a sensor network, and the like. The devices may include a digital signal processor (DSP), field programmable gate array (FPGA), application specific integrated circuit (ASIC) or similar hardware, firmware and/or software for implementing the techniques. If implemented in software, a computer-readable medium may store computer readable instructions, i.e., program code, that can be executed by a processor or DSP to carry out one of more of the techniques described above. For example, the computer-readable medium may comprise random access memory (RAM), read-only memory (ROM), non-volatile random access memory (NVRAM), electrically erasable programmable read-only memory (EEPROM), flash memory, or the like. The computer-readable medium may comprise computer readable instructions that when executed in a wireless communication device, cause the wireless communication device to carry out one or more of the techniques described herein. These and other embodiments are within the scope of the following claims.

The invention claimed is:

1. A method comprising:
processing a data stream of information-bearing symbols to form bursts of information symbols;
arranging training symbols within the stream of information-bearing symbols to ensure at least one polarity transition within every set of three consecutive training symbols at a receiver to synchronize timing of a transmitter and the receiver; and
outputting the bursts of information-bearing symbols and training symbols as an ultra wideband (UWB) waveform through a communication channel to the receiver.

2. The method of claim 1, wherein arranging the training symbols further comprises inserting K training symbols within each burst of information-bearing symbols.

3. The method of claim 2, wherein inserting the training symbols comprises inserting the K training symbols as the first K symbols of each burst.

4. The method of claim 1, wherein arranging the training symbols comprises arranging K=4 training symbols according to the following equation where s(k) is the $k^{th}$ symbol of the UWB waveform:

$$s(k) = \begin{cases} +1, & \text{if } (k \bmod 4) = 0, \text{ or, } 1 \\ -1, & \text{if } (k \bmod 4) = 2, \text{ or } 3. \end{cases}$$

5. The method of claim 1, wherein arranging the training symbols comprises arranging a minimum number of training symbols, each training symbol having a calculated polarity.

6. A method comprising:
receiving an ultra wideband (UWB) waveform through a wireless communication channel, wherein the received UWB waveform comprises bursts of information-bearing symbols;
selecting a template to be used for estimating the timing offset of a burst of the received UWB waveform, wherein the template comprises a segment of a burst of the received UWB waveform;
correlating the template with a segment of a burst of the received waveform so as to form an estimate of the timing offset of the received UWB waveform; and
outputting a stream of symbol estimates in accordance with the estimated timing offset.

7. The method of claim 6:
wherein selecting the template comprises selecting a segment from a burst of the received UWB waveform of one symbol duration;
wherein the segment of the received UWB waveform to be correlated with the template comprises a segment from a burst of the received UWB waveform of one symbol duration adjacent to the template; and
wherein correlating the template with a segment of the received UWB waveform comprises correlating the template with the selected adjacent segment of one symbol duration from the burst of the received UWB waveform according to the following equation:

$$\hat{R}_{xx}(n) = \frac{2}{M} \sum_{m=0}^{M/2-1} \left| \int_0^{T_s} \chi_{n,2m}(t) \chi_{n,2m+1}(t) \, dt \right|$$

wherein m∈[0,M−1] with M≧2 and n∈[0,$N_f$−1], where m is an integer.

8. The method of claim 7, wherein correlating the template with a segment of the received UWB waveform further comprises selecting the value of $\hat{n}_\epsilon$ by peak-picking the result of correlating M/2 pairs of adjacent templates and segments of the received UWB waveform according to the following equation:

$$\hat{n}_\epsilon = \underset{n}{\arg\max} \{\hat{R}_{xx}(n)\}.$$

9. The method of claim 8, wherein n determines the resolution of the estimate of the timing offset.

10. The method of claim 8, wherein n is equal to a non-integer value.

11. The method of claim 8, wherein n equals one frame duration $T_f$ results in frame-level resolution of the timing offset estimate.

12. The method of claim 6:
wherein the received UWB waveform comprises bursts of information-bearing symbols and training symbols, wherein the training symbols are arranged so as to ensure at least one polarity transition within every set of three training consecutive symbols;
wherein the template to be used for estimating the timing offset of a burst of the received UWB waveform comprises a segment from a burst of the received UWB waveform, wherein the template is selected from the training symbols;
correlating the template with a segment of a burst of the received waveform so as to form an estimate of the timing offset of the received UWB waveform, wherein the segment comprises a segment of one symbol duration from a burst of the received UWB waveform; and
outputting a stream of symbol estimates in accordance with the estimated timing offset.

13. The method of claim 12, wherein the training symbols are the first K symbols of each burst.

14. The method of claim 13, wherein K training symbols within each burst of symbols are arranged so as to ensure at least one polarity transition within one symbol duration of the received UWB signal.

15. The method of claim 14, wherein K=4 training symbols are selected according to the following equation where s(k) is the $k^{th}$ symbol of the transmitted signal:

$$s(k) = \begin{cases} +1, & \text{if } (k \bmod 4) = 0, \text{ or, } 1 \\ -1, & \text{if } (k \bmod 4) = 2, \text{ or } 3. \end{cases}$$

16. The method of claim 14, wherein K comprises a minimum number of training symbols, each training symbol having a calculated polarity.

17. The method of claim 12:
wherein the template comprises a segment of one symbol duration from the K training symbols of a burst of the received UWB waveform;
wherein the segment of the received UWB waveform to be correlated with the template comprises a segment of one symbol duration from the K training symbols of a burst of the received UWB waveform, wherein the segment is adjacent to the template; and
wherein correlating the template with the segment of the received UWB waveform comprises correlating the template with the selected adjacent segment of one symbol duration from the burst of the received UWB waveform according to the following equation:

$$\hat{R}_{xx}(n) = \frac{2}{M} \sum_{m=0}^{M/2-1} \left| \int_0^{T_s} \chi_{n,2m}(t)\chi_{n,2m+1}(t)\,dt \right|$$

wherein m∈[0,M−1] with M≧2 and n∈[0,$N_f$−1], where m is an integer.

18. The method of claim 17, wherein correlating the template with a segment of the received UWB waveform further comprises selecting the value of $\hat{n}_\epsilon$ by peak-picking the result of correlating M/2 pairs of adjacent templates and segments of the received UWB waveform according to the following equation:

$$\hat{n}_\varepsilon = \underset{n}{\mathrm{argmax}}\{\hat{R}_{xx}(n)\}.$$

19. The method of claim 18, wherein n determines the resolution of the estimate of the timing offset.

20. The method of claim 18, wherein n is equal to a non-integer value.

21. The method of claim 18, wherein n equals one frame duration $T_f$ and results in frame-level resolution of the timing offset estimate.

22. A wireless communication device comprising:
a pulse generator that processes a data stream of information bearing symbols to form bursts of information bearing symbols and arranges training symbols within the stream of information-bearing symbols to ensure at least one polarity transition within every set of three consecutive training symbols at a receiver to synchronize timing of a transmitter and the receiver; and
a pulse shaping unit that outputs an ultra wideband (UWB) transmission waveform from the bursts of information-bearing symbols and training symbols.

23. The wireless communication device of claim 22, wherein the pulse generator arranges K training symbols within each burst of information-bearing symbols.

24. The wireless communication device of claim 23, wherein the pulse generator arranges the K training symbols as the first K symbols of each burst.

25. The wireless communication device of claim 24, wherein the pulse generator arranges K=4 training symbols according to the following equation where s(k) is the $k^{th}$ symbol of the UWB waveform:

$$s(k) = \begin{cases} +1, & \text{if } (k \bmod 4) = 0, \text{ or, } 1 \\ -1, & \text{if } (k \bmod 4) = 2, \text{ or } 3. \end{cases}$$

26. The wireless communication device of claim 24, wherein the pulse generator arranges a minimum number of training symbols that each has a calculated polarity.

27. A wireless communication device comprising:
an antenna to receive an ultra wideband (UWB) waveform through a wireless communication channel, wherein the received UWB waveform includes bursts of information-bearing symbols;
a timing synchronization unit to form an estimation of a timing offset based on the received UWB waveform by selecting a template comprising a segment of a burst of the received UWB waveform, and by correlating the template with a segment of a burst of the received waveform; and
a symbol detector to output a stream of estimate symbols based on the estimate of the timing offset.

28. The wireless communication device of claim 27, wherein the timing synchronization unit:
selects the template wherein the template comprises a segment from a burst of the received UWB waveform of one symbol duration; and
wherein the segment of the received UWB waveform to be correlated with the template comprises a segment from a burst of the received UWB waveform of one symbol duration adjacent to the template; and
correlates the template with a segment of the received UWB waveform comprising a segment from a burst of the received UWB waveform of one symbol duration, the segment being adjacent to the template, to form an estimate of the timing offset according to the following equation:

$$\hat{R}_{xx}(n) = \frac{2}{M} \sum_{m=0}^{M/2-1} \left| \int_0^{T_s} \chi_{n,2m}(t)\chi_{n,2m+1}(t)\,dt \right|$$

wherein m∈[0,M−1] with M≧2 and n∈[0,$N_f$−1], where m is an integer.

29. The wireless communication device of claim 28, wherein the timing synchronization unit forms an estimate of the timing offset by peak-picking the result of correlating the M/2 pairs of adjacent templates and segments of a burst of the received UWB waveform according to the following equation:

$$\hat{n}_\varepsilon = \underset{n}{\mathrm{argmax}}\{\hat{R}_{xx}(n)\}.$$

30. The wireless communication device of claim 29, wherein n determines the resolution of the estimate of the timing offset.

31. The wireless communication device of claim 29, wherein n is equal to a non-integer value.

32. The wireless communication device of claim 29, wherein n equals one frame duration $T_f$ results in frame-level resolution of the timing offset estimate.

33. The wireless communication device of claim 27:
wherein the antenna receives a UWB waveform comprising bursts of information-bearing symbols and training symbols;
wherein the timing synchronization unit selects a template, wherein the template comprises a segment of a burst from the training symbols of the received UWB waveform and correlates the template with a segment of a burst from the training symbols of the received waveform so as to form an estimate of the timing offset of the received UWB waveform; and
wherein the symbol detector outputs a stream of estimate symbols based on the estimate of the timing offset.

34. The wireless communication device of claim 33, wherein the antenna receives K training symbols as the first K symbols for each burst.

35. The wireless communication device of claim 33, wherein K training symbols within each burst of symbols are arranged so as to ensure at least one polarity transition within one symbol duration of the received UWB waveform.

36. The wireless communication device of claim 35, wherein K=4 training symbols are arranged according to the following equation where s(k) is the $k^{th}$ symbol of the transmitted signal:

$$s(k) = \begin{cases} +1, & \text{if } (k \bmod 4) = 0, \text{ or, } 1 \\ -1, & \text{if } (k \bmod 4) = 2, \text{ or } 3. \end{cases}$$

37. The communication device of claim 35, wherein a minimum number of training symbols are arranged, such that each training symbol has a calculated polarity.

38. The wireless communication device of claim 33, wherein the timing synchronization unit:
selects the template, wherein the template comprises a segment of one symbol duration from the K training symbols of a burst of the received UWB waveform;
correlates the template with a segment of the received UWB waveform, wherein the segment comprises the segment of one symbol duration from the K training symbols of the burst of the received UWB waveform adjacent to the template, according to the following equation:

$$\hat{R}_{xx}(n) = \frac{2}{M} \sum_{m=0}^{M/2-1} \left| \int_0^{T_s} \chi_{n,2m}(t)\chi_{n,2m+1}(t)\,dt \right|$$

wherein $m \in [0, M-1]$ with $M \geq 2$ and $n \in [0, N_f-1]$, where m is an integer.

39. The wireless communication device of claim 38, wherein correlating the template with a segment of the received UWB waveform further comprises selecting the value of $\hat{n}_\epsilon$ by peak-picking the result of correlating M/2 pairs of adjacent templates and segments of the received UWB waveform according to the following equation:

$$\hat{n}_\varepsilon = \arg\max_n \{\hat{R}_{xx}(n)\}.$$

40. The wireless communication device of claim 39, wherein n determines the resolution of the estimate of the timing offset.

41. The wireless communication device of claim 39, wherein n is equal to a non-integer value.

42. The wireless communication device of claim 39, wherein n equals one frame duration $T_f$ results in frame-level resolution of the timing offset estimate.

43. The wireless communication device of claim 42, wherein the symbol detector outputs a stream of estimate symbols based on the timing offset by delaying a time to initiate the estimate of the received signal are initiated by $\hat{n}_\epsilon T_f$ seconds.

44. A system comprising:
a transmitter that processes a data stream of symbols to form bursts of information-bearing symbols and generates an ultra wideband (UWB) waveform through a wireless communication channel; and
a receiver that receives the transmitted signal through a wireless communication channel, selects a segment of the received UWB waveform to use as a template, forms an estimate of the timing offset based on the correlation of the template with a segment of a burst of the received UWB waveform, and outputs a stream of estimate symbols based on the estimate of the timing offset.

* * * * *